US010974764B2

(12) United States Patent
Inoue et al.

(10) Patent No.: US 10,974,764 B2
(45) Date of Patent: Apr. 13, 2021

(54) PARKING ASSIST DEVICE

(71) Applicant: MITSUBISHI ELECTRIC CORPORATION, Tokyo (JP)

(72) Inventors: Satoru Inoue, Tokyo (JP); Mitsuo Shimotani, Tokyo (JP); Tadashi Miyahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 225 days.

(21) Appl. No.: 16/080,996

(22) PCT Filed: Apr. 15, 2016

(86) PCT No.: PCT/JP2016/062140
§ 371 (c)(1),
(2) Date: Aug. 29, 2018

(87) PCT Pub. No.: WO2017/179198
PCT Pub. Date: Oct. 19, 2017

(65) Prior Publication Data
US 2019/0135342 A1    May 9, 2019

(51) Int. Cl.
*B62D 15/02* (2006.01)
*G08G 1/16* (2006.01)
(Continued)

(52) U.S. Cl.
CPC .......... *B62D 15/0285* (2013.01); *B60K 35/00* (2013.01); *B60Q 9/004* (2013.01);
(Continued)

(58) Field of Classification Search
CPC .. B62D 15/0285; B62D 15/027; B60K 35/00; B60Q 9/004; B60R 1/00; B60W 30/06; G08G 1/16
See application file for complete search history.

(56) References Cited

U.S. PATENT DOCUMENTS 8,908,035 B2 * 12/2014 Russ .................. B60R 1/00
                                            348/148
9,557,741 B1 *  1/2017 Elie .................. G05D 1/0088
(Continued)

FOREIGN PATENT DOCUMENTS

JP    4428390 B2    3/2010
JP    5083079 B2    11/2012
(Continued)

OTHER PUBLICATIONS

International Search Report for PCT/JP2016/062140 (PCT/ISA/210) dated May 31, 2016.
(Continued)

*Primary Examiner* — Hussein Elchanti
(74) *Attorney, Agent, or Firm* — Birch, Stewart, Kolasch & Birch, LLP.

(57) ABSTRACT

Disclosed is a parking assist device (100) including a parking assist control unit (5) that performs parking assist for a host vehicle (1) by using a first sensor (4) for parking assist disposed in the host vehicle (1), and a guide display control unit (25) that causes a display device (20) to display a guide display based on a first effective detection range ($A_L$, $A_R$) of the first sensor (4) in a state in which the guide display is superimposed on a front view with respect to the host vehicle (1).

12 Claims, 20 Drawing Sheets

(51) Int. Cl.
  *B60W 30/06* (2006.01)
  *B60K 35/00* (2006.01)
  *B60Q 9/00* (2006.01)
  *B60R 1/00* (2006.01)
(52) U.S. Cl.
  CPC ............... *B60R 1/00* (2013.01); *B60W 30/06* (2013.01); *B62D 15/027* (2013.01); *G08G 1/16* (2013.01); *B60R 2300/301* (2013.01); *B60R 2300/806* (2013.01)

(56) References Cited

U.S. PATENT DOCUMENTS

| | | | |
|---|---|---|---|
| 9,896,091 B1* | 2/2018 | Kurt | B62D 15/0285 |
| 2004/0267420 A1* | 12/2004 | Tanaka | B62D 15/0285 |
| | | | 701/36 |
| 2005/0060073 A1* | 3/2005 | Tanaka | B62D 15/0285 |
| | | | 701/36 |
| 2005/0270177 A1* | 12/2005 | Mori | G08G 1/166 |
| | | | 340/932.2 |
| 2007/0027598 A1* | 2/2007 | Mori | B60W 10/184 |
| | | | 701/41 |
| 2007/0282504 A1* | 12/2007 | Luke | B62D 15/0285 |
| | | | 701/44 |
| 2009/0091475 A1 | 4/2009 | Watanabe et al. | |
| 2009/0259365 A1* | 10/2009 | Rohlfs | B62D 15/028 |
| | | | 701/41 |
| 2009/0273674 A1 | 11/2009 | Russ et al. | |
| 2010/0033348 A1 | 2/2010 | Kawabata et al. | |
| 2010/0070138 A1* | 3/2010 | Schoening | B60Q 9/004 |
| | | | 701/42 |
| 2010/0259420 A1* | 10/2010 | Von Reyher | B62D 15/028 |
| | | | 340/932.2 |
| 2010/0286872 A1* | 11/2010 | Endo | B62D 7/159 |
| | | | 701/41 |
| 2011/0120797 A1* | 5/2011 | Kitahata | B62D 5/0409 |
| | | | 180/443 |
| 2011/0304477 A1* | 12/2011 | Yoshihashi | B60W 50/14 |
| | | | 340/932.2 |
| 2012/0133767 A1* | 5/2012 | Muramatsu | H04N 5/232 |
| | | | 348/148 |
| 2012/0296523 A1* | 11/2012 | Ikeda | B62D 15/0275 |
| | | | 701/41 |
| 2013/0021171 A1* | 1/2013 | Hsu | G06K 9/00812 |
| | | | 340/932.2 |
| 2013/0144492 A1* | 6/2013 | Takano | B62D 15/0285 |
| | | | 701/42 |
| 2014/0114529 A1* | 4/2014 | An | B60R 1/00 |
| | | | 701/36 |
| 2014/0324310 A1* | 10/2014 | Kobayashi | B62D 15/027 |
| | | | 701/70 |
| 2014/0333455 A1* | 11/2014 | Lee | B62D 15/028 |
| | | | 340/932.2 |
| 2015/0057887 A1* | 2/2015 | Kim | B62D 6/007 |
| | | | 701/41 |
| 2015/0142267 A1 | 5/2015 | Lee | |
| 2015/0278611 A1* | 10/2015 | Chi | G06K 9/00798 |
| | | | 348/148 |
| 2016/0110619 A1* | 4/2016 | Kim | B60W 30/06 |
| | | | 382/104 |
| 2016/0280263 A1* | 9/2016 | Mori | B62D 15/0285 |
| 2017/0297385 A1* | 10/2017 | Kim | G01C 21/26 |
| 2017/0300062 A1* | 10/2017 | Kim | B62D 15/02 |
| 2018/0029591 A1* | 2/2018 | Lavoie | G06N 7/005 |
| 2018/0308359 A1* | 10/2018 | Hayakawa | B62D 15/0285 |
| 2018/0327028 A1* | 11/2018 | Kamiyama | B62D 15/028 |

FOREIGN PATENT DOCUMENTS

| | | |
|---|---|---|
| JP | 2013-91330 A | 5/2013 |
| JP | 2015-24725 A | 2/2015 |
| WO | WO 2007/058246 A1 | 5/2007 |

OTHER PUBLICATIONS

Office Action dated Dec. 3, 2020 in corresponding Chinese Patent Application No. 201680084462.3 with English Translation.

* cited by examiner

PARKING ASSIST DEVICE

TECHNICAL FIELD

The present invention relates to a parking assist device.

BACKGROUND ART

Conventionally, a parking assist device that performs parking assist for a vehicle by using sensors disposed in the vehicle has been developed (for example, refer to Patent Literature 1 or Patent Literature 2). The parking assist device of Patent Literature 1 determines a parking space of a host vehicle by using an ultrasonic sensor, and displays this parking space while superimposing the parking space on a photographed image of an area in the rear of the host vehicle. The parking assist device of Patent Literature 2 calculates a desired value of a steering angle by using an ultrasonic sensor, and performs so-called "automatic parking".

CITATION LIST

Patent Literature

Patent Literature 1: Japanese Unexamined Patent Application Publication No. 2013-91330
Patent Literature 2: Japanese Unexamined Patent Application Publication No. 2015-24725

SUMMARY OF INVENTION

Technical Problem

In general, the effective detection range of sensors for parking assist is approximately from several tens of centimeters to several meters. The accuracy of detection of the sensors in an area outside the effective detection range degrades greatly. When an obstacle which is an object to be detected in the parking assist exists outside the effective detection range, the obstacle cannot be normally detected by using the sensors, and the parking assist device cannot perform appropriate parking assist.

A problem with the conventional parking assist devices is that the driver of the host vehicle cannot visually grasp the effective detection range. A further problem with the conventional parking assist devices is that before performing the parking assist, the devices cannot guide the host vehicle in such away that an obstacle that is an object to be detected in the parking assist enters the effective detection range.

As a result, a problem with the conventional parking assist devices is that the reliability of the parking assist is low.

The present invention is made in order to solve the above-mentioned problems, and it is therefore an object of the present invention to provide an improvement in the reliability of parking assist by a parking assist device.

Solution to Problem

According to the present invention, there is provided a parking assist device including a processor, and a memory storing instructions which, when executed by the processor, causes the processor to perform processes of: performing parking assist for a vehicle by using a first sensor for parking assist disposed in the vehicle, and causing a display device to display a guide display based on an effective detection range of the first sensor in a state in which the guide display is superimposed on a front view with respect to the vehicle, in which the guide display shows information about the effective detection range, and shows an outer edge of the effective detection range, the outer edge being set with respect the vehicle.

Advantageous Effects of Invention

Because the parking assist device of the present invention is configured as above, the reliability of the parking assist can be improved.

DESCRIPTION OF EMBODIMENTS

Hereafter, in order to explain this invention in greater detail, embodiments of the present invention will be described with reference to the accompanying drawings.

Embodiment 1

Figure 1:
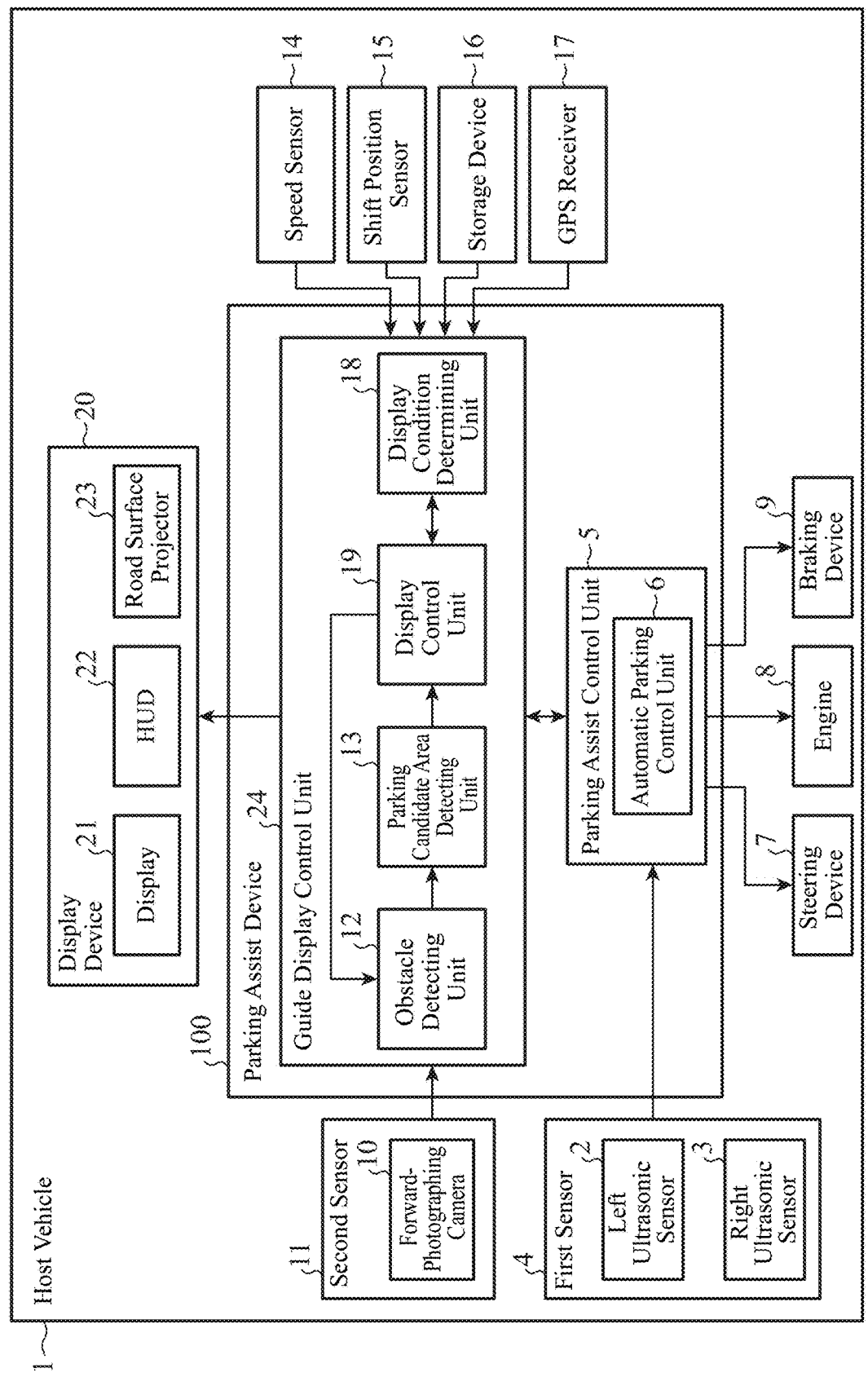
FIG. 1 is a functional block diagram showing a main part of a parking assist device according to Embodiment 1 of the present invention.
Figure 2:
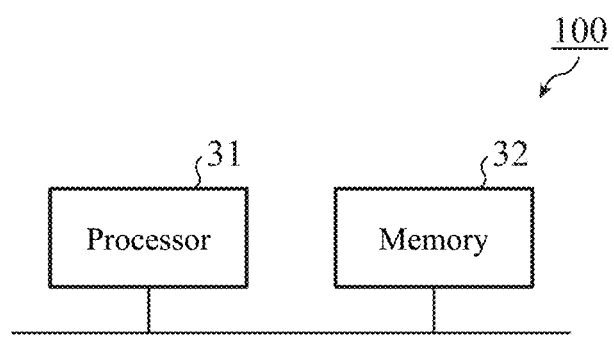
FIG. 2 is a hardware block diagram showing the main part of the parking assist device according to Embodiment 1 of the present invention.
Figure 3:
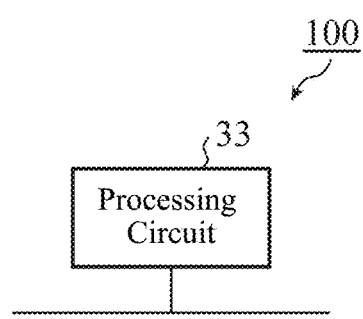
FIG. 3 is another hardware block diagram showing the main part of the parking assist device according to Embodiment 1 of the present invention.

FIG. 1 a functional block diagram showing a main part of a parking assist device according to Embodiment 1 of the present invention. FIG. 2 is a hardware block diagram showing the main part of the parking assist device according to Embodiment 1 of the present invention. FIG. 3 is another hardware block diagram showing the main part of the parking assist device according to Embodiment 1 of the present invention. By referring to FIGS. 1 to 3, an explanation will be made focusing on an example in which the parking assist device 100 of Embodiment 1 is mounted in a vehicle (referred to as a "host vehicle" hereinafter) 1 which is a four-wheel vehicle.

At least one ultrasonic sensor (referred to as a "left ultrasonic sensor" hereinafter) 2 is disposed in a left side portion of the host vehicle 1. At least one ultrasonic sensor (referred to as a "right ultrasonic sensor" hereinafter) 3 is disposed in a right side portion of the host vehicle 1. A first sensor 4 is constituted by the left ultrasonic sensor 2 and the right ultrasonic sensor 3.

A parking assist control unit 5 performs parking assist for the host vehicle 1 by using the first sensor 4. Concretely, for example, the parking assist control unit 5 has an automatic parking control unit 6, and performs automatic parking of the host vehicle 1. More specifically, information showing the size of the host vehicle 1 is stored in advance in the automatic parking control unit 6. The automatic parking control unit 6 causes either the left ultrasonic sensor 2 or the right ultrasonic sensor 3 to transmit an ultrasonic wave when the host vehicle 1 is traveling. When either the left ultrasonic sensor 2 or the right ultrasonic sensor 3 receives a reflected wave, the automatic parking control unit 6 supposes that an obstacle exists at a point of this reflection. The automatic parking control unit 6 detects an area (referred to as a "parkable area" hereinafter) which is included in the area by which the host vehicle 1 has passed, and in which no obstacle exists throughout a range larger than the size of the host vehicle 1. The automatic parking control unit 6 parks the host vehicle 1 in the detected parkable area in such a way as to avoid a collision between the host vehicle 1 and any obstacle.

Here, the automatic parking includes automatic control of only the operation of a steering device 7 (so-called "semi-automatic parking"), automatic control of both the operation of the steering device 7 and the torque of an engine 8 (so-called "quasi-automatic parking"), and automatic control of the operation of the steering device 7, the torque of the engine 8, and the operation of a braking device 9 (so-called "fully automatic parking"). The automatic parking control unit 6 performs at least one of the semi-automatic parking, the quasi-automatic parking, and the fully automatic parking. FIG. 1 shows an example in which the automatic parking control unit 6 performs the fully automatic parking.

A camera 10 that takes a photograph of an area in front of the host vehicle 1 (referred to as a "forward-photographing camera" hereinafter) is disposed in the host vehicle 1. More specifically, a view in front of the host vehicle 1 (referred to as a "front view" hereinafter) is taken in an image photographed by the forward-photographing camera 10 (referred to as a "front image" hereinafter). A second sensor 11 is constituted by the forward-photographing camera 10.

An obstacle detecting unit 12 detects an obstacle existing in front of the host vehicle 1 by using the second sensor 11. Concretely, for example, the obstacle detecting unit 12 detects an obstacle taken in a front image by acquiring the front image from the forward-photographing camera 10 and performing image recognition processing on this front image. An object to be detected by the obstacle detecting unit 12 is, for example, a vehicle different from the host vehicle 1 (referred to as "another vehicle" hereinafter), a road cone, a building, a wall, a fence, a pillar, an irregularity disposed on the road surface, a groove disposed on the road surface, a pedestrian, or the like.

A parking candidate area detecting unit 13 detects an area (referred to as a "parking candidate area" hereinafter) which is included in an area existing in the front of the host vehicle 1 and which is a candidate for the parkable area, by using a detection result of the obstacle detecting unit 12. Concretely, for example, information showing the size of the host vehicle 1, information showing the image photographing range of the forward-photographing camera 10, and so on are stored in advance in the parking candidate area detecting unit 13. By using these pieces of information, the parking candidate area detecting unit 13 detects, as a parking candidate area, an area which is included in an area for parking (a parking lot, a garage, a road shoulder, or the like) taken in the front image and in which no obstacle is detected throughout a range larger than the size of the host vehicle 1.

A speed sensor 14 is disposed in a front wheel portion or a rear wheel portion of the host vehicle 1, and outputs a pulse signal corresponding to the rotating speed of a wheel, i.e., a so-called "vehicle speed signal." A shift position sensor 15 detects the shift position of the transmission disposed in the host vehicle 1, and outputs a signal showing the detected shift position, i.e., a so-called "shift position signal." A storage device 16 is constituted by, for example, an auxiliary storage device such as an HDD (Hard Disk Drive) or an SSD (Solid State Drive), and stores map information. A GPS (Global Positioning System) receiver 17 receives GPS signals from not-illustrated GPS satellites.

A display condition determining unit 18 determines whether or not the host vehicle 1 is traveling by using the vehicle speed signal outputted by the speed sensor 14 and the shift position signal outputted by the shift position sensor 15. When the host vehicle 1 is traveling, the display condition determining unit 18 calculates the traveling speed of the host vehicle 1 by using the vehicle speed signal. The display condition determining unit 18 determines whether or not the traveling speed of the host vehicle 1 is equal to or greater than a preset reference speed (e.g., 30 kilometers per hour).

When the host vehicle 1 is stationary or when the host vehicle 1 is traveling at a traveling speed less than the reference speed, the display condition determining unit 18 calculates the current position of the host vehicle 1 by using the map information stored in the storage device 16 and the GPS signals received by the GPS receiver 17. The display condition determining unit 18 determines whether or not the current position of the host vehicle 1 is on a road. When the current position of the host vehicle 1 is on a road, the display condition determining unit 18 determines whether or not the road has an opposite lane by using the map information.

Information showing an effective detection range of the first sensor 4 is stored in advance in a display control unit 19. A concrete example of the effective detection range will be mentioned later by reference to FIG. 5. Further, the display control unit 19 causes a display device 20 to display a display (referred to as a "guide display" hereinafter) based on the effective detection range of the first sensor 4. The guide display is at least a display showing certain information about the effective detection range. A concrete example of the guide display will be mentioned later by reference to FIGS. 6 to 9.

Here, the display control unit 19 enables display of the guide display in accordance with a determination result by the display condition determining unit 18. More specifically, when the host vehicle 1 is stationary or when the host vehicle 1 is traveling at a traveling speed less than the reference speed, the display control unit 19 enables display of the guide display. When the host vehicle 1 is traveling at a traveling speed equal to or greater than the reference speed, the display control unit 19 sets the guide display to non-display.

The guide display includes a display (referred to as a "left guide display" hereinafter) based on an effective detection range of the left ultrasonic sensor 2, and a display (referred to as a "right guide display" hereinafter) based on an effective detection range of the right ultrasonic sensor 3. When the current position of the host vehicle 1 is on a road and the road has an opposite lane, the display control unit 19 sets a guide display on a side of the opposite lane, out of the left and right guide displays, to non-display.

Further, the display control unit 19 may enable display of the guide display in accordance with a detection result by the parking candidate area detecting unit 13. Concretely, for example, the display control unit 19 causes the display device 20 to display an image showing the parking candidate area. As an alternative, the display control unit 19 enables display of both a guide display including the parking candidate area and based on an effective detection range, and a guide display not including the parking candidate area and based on an effective detection range, out of the left and right guide displays, in different modes. As an alternative, the display control unit 19 sets a guide display not including a parking candidate area and based on an effective detection range, out of the left and right guide displays, to non-display.

Further, the display control unit 19 may acquire information showing the current steering angle from the steering device 7, and enable display of the guide display in accordance with the steering angle. Concretely, for example, the display control unit 19 causes the display device 20 to display an image showing the traveling direction of the host vehicle 1 based on the current steering angle. In FIG. 1, an illustration of a connecting line between the steering device 7 and the display control unit 19 is omitted.

The display device 20 is constituted by at least one of a display 21, an HUD (Head-Up Display) 22, and a road surface projector 23. FIG. 1 shows an example in which all the display 21, the HUD 22, and the road surface projector 23 are disposed.

The display 21 is constituted by, for example, a liquid crystal display, an organic EL (Electro Luminescence) display, a plasma display, or a cathode-ray tube display. As the display 21, for example, a display of vehicle-mounted information equipment, such as a navigation device or a display audio device mounted in the host vehicle 1, can be used. As an alternative, as the display 21, a display of an instrument board mounted in the host vehicle 1 and produced by a digital display, i.e., a so-called "integrated instrument panel" can be used. As an alternative, as the display 21, a display of a mobile information terminal, such as a smartphone, a tablet computer, or a PND (Portable Navigation Device) carried into the host vehicle 1, can be used.

In the case in which the display device 20 is constituted by the display 21, the display control unit 19 outputs both image data corresponding to the front image and image data corresponding to the guide display to the display 21. Under the control by the display control unit 19, the display 21 superimposes the guide display on the front image and displays the image on the screen. More specifically, the display screen of the display 21 is the one in which the guide display is superimposed on the front view.

The HUD 22 is constituted by, for example, a projector disposed on a dashboard or a ceiling portion of the host vehicle 1. The HUD 22 projects an image onto either the windshield of the host vehicle 1 or a semitransparent mirror located opposite to the windshield (a so-called "combiner").

In the case in which the display device 20 is constituted by the HUD 22, the display control unit 19 outputs the image data corresponding to the guide display to the HUD 22. Under the control by the display control unit 19, the HUD 22 projects the image corresponding to the guide display onto either the windshield or the combiner in such a way as to bring about a state in which the guide display is superimposed on the front view seen through the windshield when viewed from the driver's seat of the host vehicle 1.

The road surface projector 23 is constituted by, for example, a projector disposed integrally with a headlight of the host vehicle 1. The road surface projector 23 projects light with any shape and color onto a road surface in front of the host vehicle 1.

In the case in which the display device 20 is constituted by the road surface projector 23, the display control unit 19 outputs the image data corresponding to the guide display to the road surface projector 23. Under the control by the display control unit 19, the road surface projector 23 projects light corresponding to the image of the guide display onto the front road surface in such a way as to bring about a state in which the guide display is superimposed on the front view seen through the windshield when viewed from the driver's seat of the host vehicle 1.

Hereafter, a display of an image by the display 21, a projection of the image by the HUD 22, and floodlighting of light corresponding to the image by the road surface projector 23 are generically and simply called "display." More specifically, the meaning of a word "display" described in the claims of this application is not limited to a display of an image by the display 21, and also includes at least a projection of the image by the HUD 22 and floodlighting of light corresponding to the image by the road surface projector 23.

A guide display control unit 24 is constituted by the obstacle detecting unit 12, the parking candidate area detecting unit 13, the display condition determining unit 18, and the display control unit 19. The parking assist device 100 is constituted by the parking assist control unit 5 and the guide display control unit 24.

An example of the hardware configuration of the parking assist device 100 is shown in FIG. 2. As shown in FIG. 2, the parking assist device 100 is constituted by a computer and has a processor 31 and a memory 32. In the memory 32, a program for causing the computer to operate as the parking assist control unit 5 and the guide display control unit 24 which are shown in FIG. 1 is stored. The processor 31 reads and executes the program stored in the memory 32, so that the functions of the parking assist control unit 5 and the guide display control unit 24 which are shown in FIG. 1 are implemented.

The processor 31 is constituted by, for example, a CPU (Central Processing Unit), a GPU (Graphics Processing Unit), a DSP (Digital Signal Processor), a microcontroller, or a microprocessor. The memory 32 is constituted by, for example, a semiconductor memory, such as a RAM (Random Access Memory), a ROM (Read Only Memory), a flash memory, an EPROM (Erasable Programmable Read Only Memory), or an EEPROM (Electrically Erasable Programmable Read-Only Memory).

As an alternative, the parking assist device 100 is constituted by a processing circuit 33 for exclusive use, as shown in FIG. 3. The processing circuit 33 is, for example, an ASIC (Application Specific Integrated Circuit), an FPGA (Field-Programmable Gate Array), a system LSI (Large-Scale Integration), or a combination of these circuits.

The function of each of the following units: the parking assist control unit 5 and the guide display control unit 24 which are shown in FIG. 1 can be implemented by the processing circuit 33, or the functions of the units can be implemented collectively by the processing circuit 33. Concretely, for example, the function of the parking assist control unit 5 can be implemented by the processing circuit 33 of an ECU (Electronic Control Unit) mounted in the host vehicle 1, and the function of the guide display control unit 24 can be implemented by the processing circuit 33 of a navigation device mounted in the host vehicle 1.

As an alternative, some functions of the parking assist control unit 5 and the guide display control unit 24 which are shown in FIG. 1 can be implemented by the processor 31 and the memory 32 which are shown in FIG. 2, and the remaining function can be implemented by the processing circuit 33 shown in FIG. 3.

Next, the operation of the parking assist device 100 will be explained by reference to a flowchart of FIG. 4, focusing on the operation of the guide display control unit 24. When an operation of instructing a start of the parking assist is inputted to a not-illustrated input device or when a preset certain start condition is satisfied, the parking assist device 100 starts a process of step ST1.

First, in step ST1, the display condition determining unit 18 performs various determinations. More specifically, the display condition determining unit 18 determines whether or not the host vehicle 1 is traveling. When the host vehicle 1 is traveling, the display condition determining unit 18 determines whether or not the traveling speed of the host vehicle 1 is equal to or greater than the reference speed. When the host vehicle 1 is stationary or when the host vehicle 1 is traveling at a traveling speed less than the reference speed, the display condition determining unit 18 determines whether or not the current position of the host vehicle 1 is on a road. When the current position of the host vehicle 1 is on a road, the display condition determining unit 18 determines whether or not the road has an opposite lane. The display condition determining unit 18 outputs results of these determinations to the display control unit 19.

Then, in step ST2, the display control unit 19 refers to the determination results inputted in step ST1 from the display condition determining unit 18. When the host vehicle 1 is traveling at a traveling speed equal to or greater than the reference speed ("YES" in step ST2), the display control unit 19 sets a guide display to non-display. The display control unit 19 also instructs the display condition determining unit 18 to perform determinations again. As a result, the processing of the parking assist device 100 returns to step ST1.

In contrast, when the host vehicle 1 is stationary or when the host vehicle 1 is traveling at a traveling speed less than the reference speed ("NO" in step ST2), the display control unit 19 instructs the obstacle detecting unit 12 to detect an obstacle. In response to the instruction, in step ST3, the obstacle detecting unit 12 detects an obstacle existing in front of the host vehicle 1 by using the second sensor 11. More specifically, the obstacle detecting unit 12 detects an obstacle such as another vehicle by acquiring a front image from the forward-photographing camera 10 and performing image recognition processing on this front image. The obstacle detecting unit 12 outputs the front image and a result of the detection to the parking candidate area detecting unit 13.

Then, in step ST4, the parking candidate area detecting unit 13 detects a parking candidate area existing in front of the host vehicle 1. More specifically, by using the front image and the detection result which are inputted in step ST3 from the obstacle detecting unit 12, and the various pieces of information stored in advance in the parking candidate area detecting unit 13, the parking candidate area detecting unit 13 detects, as a parking candidate area, an area which is included in an area for parking taken in the front image and in which no obstacle is detected throughout a range larger than the size of the host vehicle 1. The parking candidate area detecting unit 13 outputs the front image and a result of the detection to the display control unit 19.

Then, in step ST5, the display control unit 19 causes the display device 20 to display the guide display. At this time, the display control unit 19 refers to the determination results inputted in step ST1 from the display condition determining unit 18. When the current position of the host vehicle 1 is on a road and the road has an opposite lane, the display control unit 19 sets a guide display on a side of the opposite lane, out of left and right guide displays, to non-display.

Further, at this time, the display control unit 19 may refer to the detection result inputted in step ST4 from the parking candidate area detecting unit 13, and enable display of the guide display in accordance with the detection result. Concretely, for example, the display control unit 19 causes the display device 20 to display an image showing the parking candidate area. As an alternative, the display control unit 19 enables display of both a guide display including the parking candidate area and based on an effective detection range, and a guide display not including the parking candidate area and based on an effective detection range, out of the left and right guide displays, in different modes. As an alternative, the display control unit 19 sets a guide display not including a parking candidate area and based on an effective detection range, out of the left and right guide displays, to non-display.

Further, at this time, the display control unit 19 may acquire information showing the current steering angle from the steering device 7, and enable display of the guide display in accordance with the steering angle. Concretely, for example, the display control unit 19 causes the display device 20 to display an image showing the traveling direction of the host vehicle 1 based on the current steering angle.

Then, in step ST6, the automatic parking control unit 6 determines whether or not the automatic parking is possible. More specifically, the automatic parking control unit 6 performs a process of detecting a parkable area by using the first sensor 4 in the background behind the processes of step ST3 to ST5 by the guide display control unit 24. When a parkable area is detected, the automatic parking control unit 6 determines that the automatic parking is possible. When no parkable area is detected, the automatic parking control unit 6 determines that the automatic parking is impossible.

When it is determined that the automatic parking is possible ("YES" in step ST6), the automatic parking control unit 6 notifies the display control unit 19 to that effect. In step ST7, the automatic parking control unit 6 performs the automatic parking. Further, in response to the notification from the automatic parking control unit 6, in step ST8, the display control unit 19 ends the guide display. In step ST7, the automatic parking control unit 6 can perform the automatic parking only when an operation of allowing performance of the automatic parking is inputted to the not-illustrated input device.

In contrast, when it is determined that the automatic parking is impossible ("NO" in step ST6), the automatic parking control unit 6 notifies the display control unit 19 to that effect. Then, in step ST9, the display control unit 19 determines whether or not to end the guide display. More specifically, when an operation of instructing an end of the guide display is inputted to the not-illustrated input device or when a preset certain end condition is satisfied ("YES" in step ST9), the display control unit 19 advances to step ST8 and ends the guide display. Otherwise ("NO" in step ST9), the display control unit 19 instructs the display condition determining unit 18 to perform determinations again. As a result, the processing of the parking assist device 100 returns to step ST1.

Next, an example of the effective detection range of the first sensor 4 will be explained by reference to FIG. 5. The effective detection range of the first sensor 4 includes an effective detection range (referred to as a "first effective detection range" hereinafter) relative to the host vehicle 1, and an effective detection range (referred to as a "second effective detection range" hereinafter) relative to an obstacle such as another vehicle. Any guide display of Embodiment 1 is based on the first effective detection range.

Figure 5:
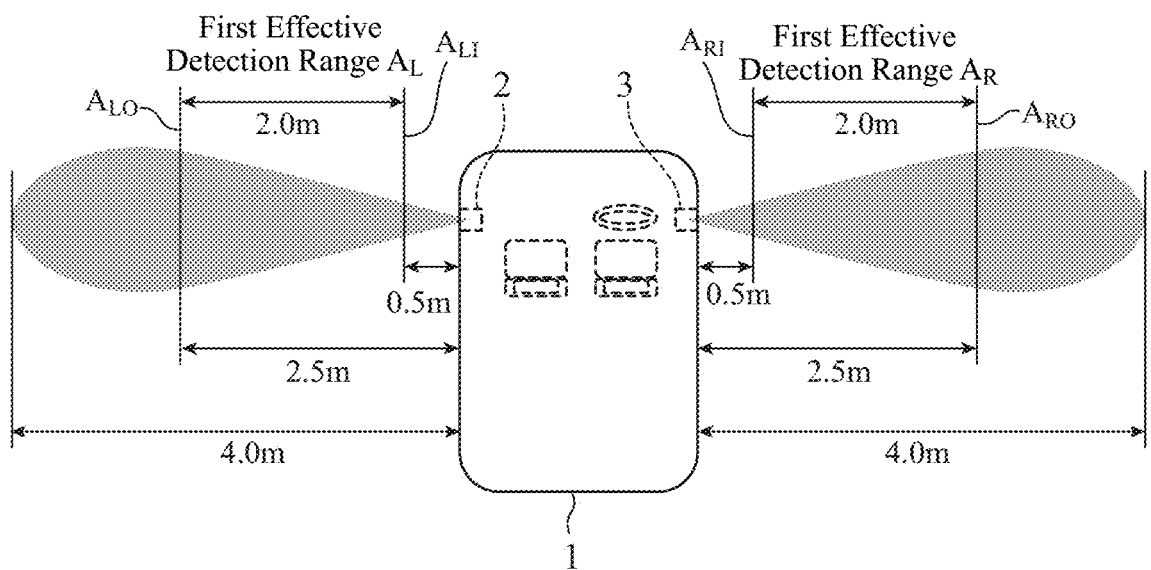
FIG. 5 is an explanatory drawing showing an example of a first effective detection range according to Embodiment 1 of the present invention.

As shown in FIG. 5, in the left ultrasonic sensor 2 for parking assist, a minimum distance in theory at which an obstacle can be detected is 0 meters, and a maximum distance is 4.0 meters. A minimum distance within this range at which an obstacle which is an object to be detected in the parking assist can be normally detected with stability is 0.5 meters and a maximum distance is 2.5 meters. In this case, the range from 0.5 meters to 2.5 meters relative to the host vehicle 1 is a first effective detection range $A_L$ of the left ultrasonic sensor 2.

Similarly, in the right ultrasonic sensor 3 for parking assist, a minimum distance in theory at which an obstacle can be detected is 0 meters, and a maximum distance is 4.0 meters. A minimum distance within this range at which an obstacle which is an object to be detected in the parking assist can be normally detected with stability is 0.5 meters and a maximum distance is 2.5 meters. In this case, the range from 0.5 meters to 2.5 meters relative to the host vehicle 1 is a first effective detection range $A_R$ of the right ultrasonic sensor 3.

The maximum distance in theory at which an obstacle can be detected by the first sensor 4 is not limited to 4.0 meters, and the first effective detection ranges $A_L$ and $A_R$ are not limited to the range from 0.5 meters to 2.5 meters. These values are examples, and differ depending on the type and the performance of the first sensor 4, the environmental temperature at the time of use, and so on.

More specifically, when the parking assist control unit 5 performs the parking assist, an obstacle existing inside the inner edge $A_{LI}$ or $A_{RI}$ of the first effective detection range $A_L$ or $A_R$ with respect to the host vehicle 1 cannot be normally detected by using the first sensor 4. Further, an obstacle existing outside the outer edge $A_{LO}$ or $A_{RO}$ of the first effective detection range $A_L$ or $A_R$ with respect to the host vehicle 1 cannot be normally detected by using the first sensor 4. Therefore, a problem is that, for example, an area where an obstacle exists is erroneously detected as a parkable area. To this problem, the guide display of Embodiment 1 notifies the driver of the host vehicle 1 that an obstacle which is an object to be detected in the parking assist is outside the first effective detection range $A_L$ or $A_R$, before the parking assist is performed.

Next, an example of the guide display will be explained by reference to FIGS. 6 and 7. The host vehicle 1 is traveling in a parking lot at a traveling speed less than the reference speed. Three other vehicles $B_{L1}$, $B_{L2}$, and $B_{L4}$ are parked in left-side spaces in front of the host vehicle 1. Four other vehicles $B_{R1}$ to $B_{R4}$ are parked in right-side spaces in front of the host vehicle 1. A parking candidate area exists between the other vehicles $B_{L2}$ and $B_{L4}$ in left-side spaces in front.

Figure 6:
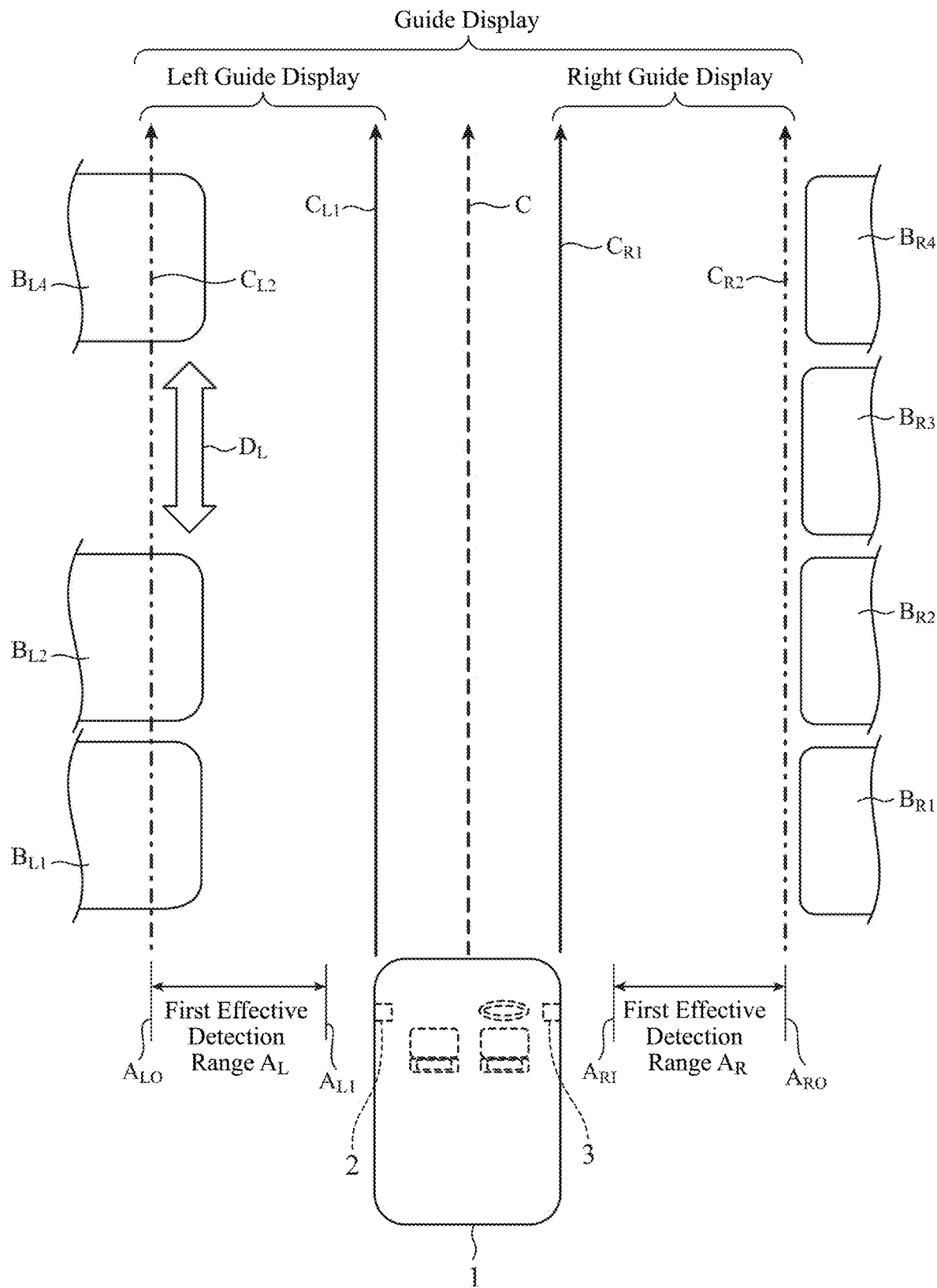
FIG. 6 is an explanatory drawing showing the content of a guide display according to Embodiment 1 of the present invention.

In FIG. 6, an arrow image C shows the traveling direction of the host vehicle 1 when the host vehicle 1 is traveling in a state of maintaining the current steering angle (in the example of FIG. 6, the host vehicle is going straight ahead). An arrow image $C_{L1}$ shows the locus of a left side portion of the host vehicle 1 in the same case. An arrow image $C_{R1}$ shows the locus of a right side portion of the host vehicle 1 in the same case. An arrow image $C_{L2}$ shows the locus of the outer edge $A_{LO}$ of the first effective detection range $A_L$ in the same case. An arrow image $C_{R2}$ shows the locus of the outer edge $A_{RO}$ of the first effective detection range $A_R$ in the same case. An arrow image $D_L$ shows the parking candidate area between the other vehicles $B_{L2}$ and $B_{L4}$.

More specifically, when the host vehicle 1 starts from the state shown in FIG. 6 and then travels in the state of maintaining the current steering angle, a front end part or a rear end part (generically referred to as a "nose part" hereinafter) of each of the other vehicles $B_{L1}$, $B_{L2}$, and $B_{L4}$ in left-side spaces in front enters the first effective detection range $A_L$. In contrast, all the other vehicles $B_{L1}$ to $B_{L4}$ in right-side spaces in front are outside the first effective detection range $A_R$.

The display control unit 19 causes the display device 20 to display these arrow images C, $C_{L1}$, $C_{R1}$, $C_{L2}$, $C_{R2}$, and $D_L$ in a state in which the images are superimposed on the front view. More specifically, the left guide display is constituted by the arrow images $C_{L1}$, $C_{L2}$, and $D_L$, and the right guide display is constituted by the arrow images $C_{R1}$ and $C_{R2}$. The guide display is constituted by the left guide display, the right guide display, and the arrow image C.

Figure 7:
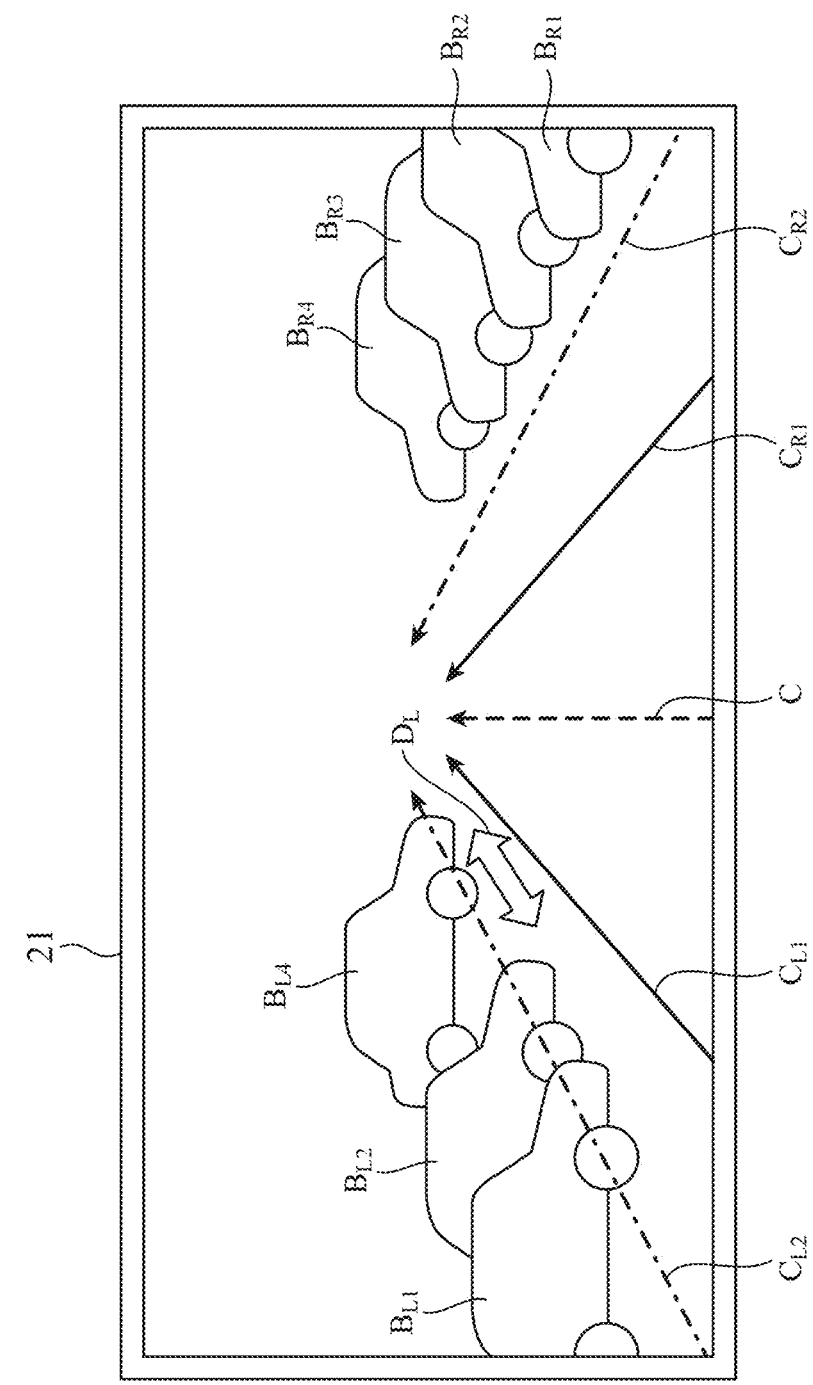
FIG. 7 is an explanatory drawing showing a state in which a guide display corresponding to the content of FIG. 6 is displayed on a display.

FIG. 7 shows an example in which the display 21 of the navigation device is caused to display the guide display corresponding to the content of FIG. 6. In FIG. 7, the arrow image $C_{L2}$ corresponding to the outer edge $A_{LO}$ of the first effective detection range $A_L$ is superimposed on the other vehicles $B_{L1}$, $B_{L2}$, and $B_{L4}$ inside the first effective detection range $A_L$. In contrast, the other vehicles $B_{R1}$ to $B_{R4}$ outside the first effective detection range $A_R$ are apart from the arrow image $C_{R2}$ corresponding to the outer edge $A_{RO}$ of the first effective detection range $A_R$. In this way, the driver of the host vehicle 1 can visually grasp whether or not each of the other vehicles $B_{L1}$, $B_{L2}$, $B_{L4}$, and $B_{R1}$ to $B_{R4}$ is inside the first effective detection range $A_L$ or $A_R$ of the first sensor 4 from the location of the arrow images $C_{L2}$ and $C_{R2}$ with respect to the other vehicles $B_{L1}$, $B_{L2}$, $B_{L4}$, and $B_{R1}$ to $B_{R4}$.

In the example shown in FIGS. 6 and 7, the left guide display is the one including the parking candidate area and based on the first effective detection range $A_L$, and the right guide display is the one not including the parking candidate area and based on the first effective detection range $A_R$. Therefore, the display control unit 19 can display both the right guide display and the left guide display in different modes. Concretely, for example, the display control unit 19 makes the arrow images $C_{R1}$ and $C_{R2}$ lighter in color, lower in the degrees of lightness, or thinner in width, than those of the arrow images $C_{L1}$ and $C_{L2}$. As an alternative, the display control unit 19 blinks the arrow images $C_{L1}$ and $C_{L2}$. As an alternative, the display control unit 19 sets only the arrow images $C_{R1}$ and $C_{R2}$ out of the guide display to non-display.

In the example shown in FIGS. 6 and 7, the arrow image C showing the traveling direction of the host vehicle 1 and the arrow image $D_L$ showing the parking candidate area are not indispensable displays. The guide display can be constituted by only the remaining arrow images $C_{L1}$, $C_{R1}$, $C_{L2}$, and $C_{R2}$.

Figure 8:
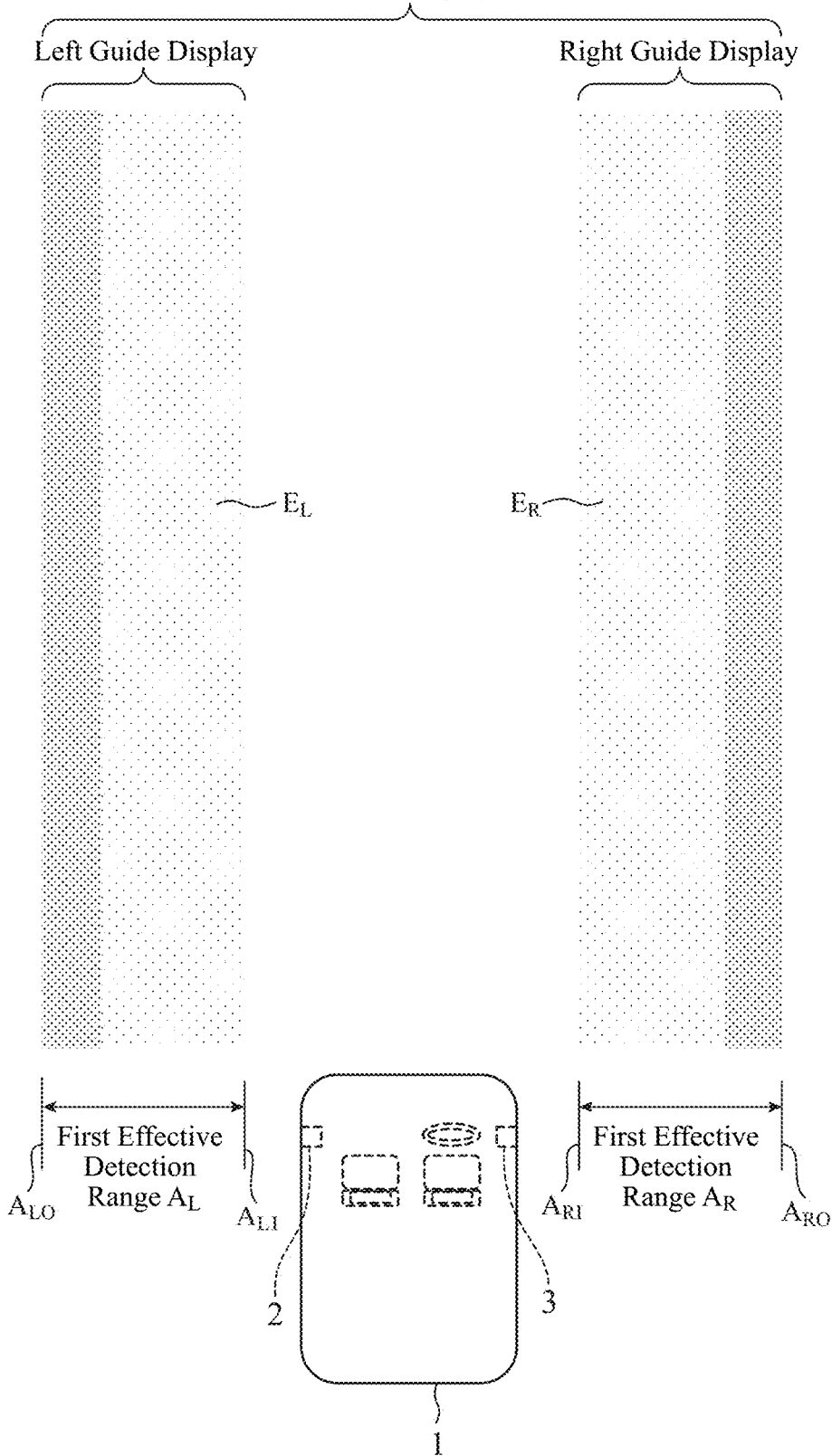
FIG. 8 is an explanatory drawing showing the content of another guide display according to Embodiment 1 of the present invention.
Figure 9:
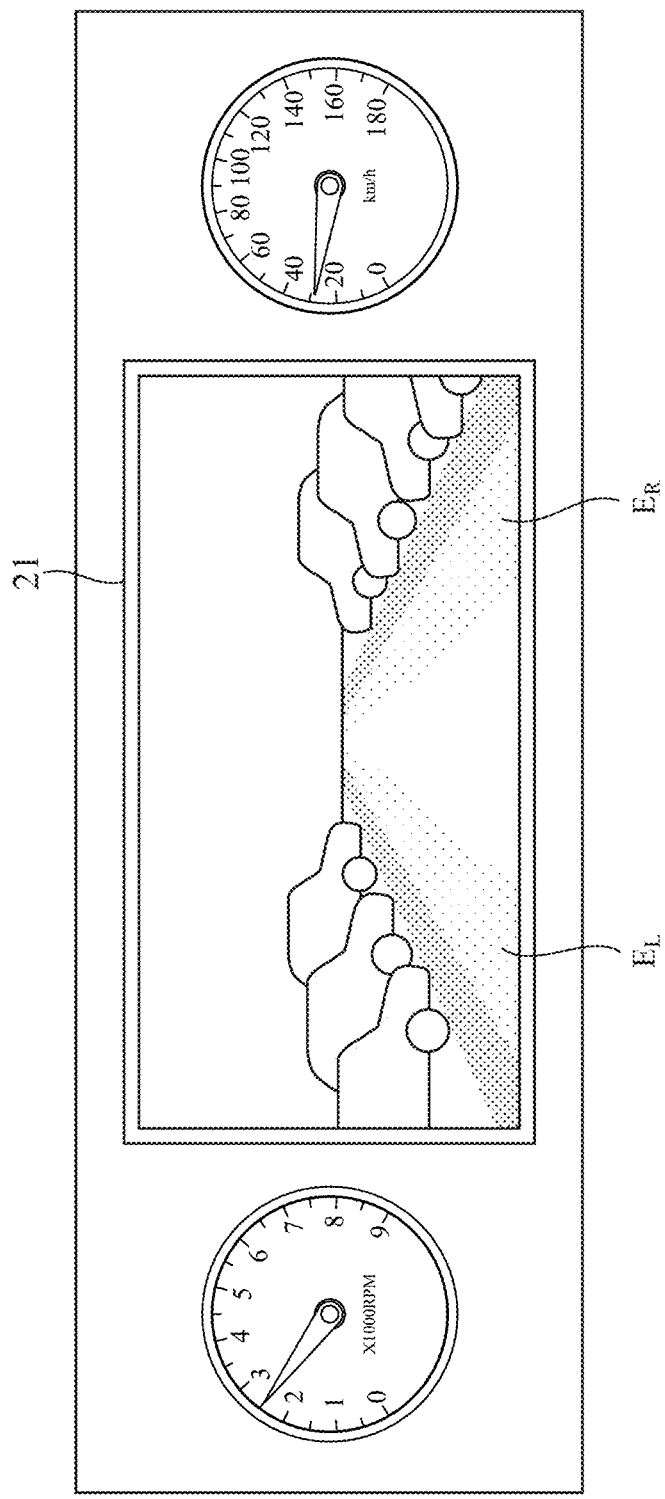
FIG. 9 is an explanatory drawing showing a state in which a guide display corresponding to the content of FIG. 8 is displayed on the display.

Next, another example of the guide display will be explained by reference to FIGS. 8 and 9. A belt-shaped image $E_L$ shown in FIG. 8 corresponds to the locus of the first effective detection range $A_L$ relative to the host vehicle 1 when the host vehicle 1 is traveling in the state of maintaining the current steering angle (in the example of FIG. 8, the host vehicle is going straight ahead). More specifically, the belt-shaped image $E_L$ shows the loci of the inner edge $A_{LI}$ and the outer edge $A_{LO}$ of the first effective detection range $A_L$ in this case. Further, a belt-shaped image $E_R$ corresponds to the locus of the first effective detection range $A_R$ in the same case. More specifically, the belt-shaped image $E_R$ shows the loci of the inner edge $A_{RI}$ and the outer edge $A_{RO}$ of the first effective detection range $A_R$ in this case.

The display control unit 19 causes the display device 20 to display the belt-shaped images $E_L$ and $E_R$ in a state in which the images are superimposed on the front view. More specifically, the left guide display is constituted by the belt-shaped image $E_L$, and the right guide display is constituted by the belt-shaped image $E_R$. FIG. 9 shows an example in which the display 21 of the integrated instrument panel displays the guide display corresponding to the content of FIG. 8.

At this time, the display control unit 19 may enable display of a part of the belt-shaped image $E_L$, the part including the outer edge $A_{LO}$, in a mode different from that for the remaining part. Similarly, the display control unit 19 may enable display of a part of the belt-shaped images $E_R$, the part including the outer edge $A_{RO}$, in a mode different from that for the remaining part. In the example of FIGS. 8 and 9, the parts including the outer edges $A_{LO}$ and $A_{RO}$ are displayed in a color darker than that of the remaining parts.

The display control unit 19 can implement the same guide display as that illustrated in each of FIGS. 6 to 9 by using the HUD 22. Further, the display control unit 19 can implement the same guide display as that illustrated in each of FIGS. 6 to 9 by using the road surface projector 23.

Further, the first sensor 4 should just be a sensor for parking assist, i.e., a sensor that has an effective detection range approximately from several tens of centimeters to several meters, and that can detect an obstacle existing in the surroundings of the host vehicle 1, and is not limited to an ultrasonic sensor. The first sensor 4 can be constituted by, for example, a laser sensor, a radar sensor, or an image sensor. As an alternative, the first sensor 4 can be constituted by a camera that takes a photograph of an area in the surroundings of the host vehicle 1. In this case, the parking assist control unit 5 can convert an image photographed by the camera into a bird's-eye view image, and perform parking assist using a so-called "around view monitor" (registered trademark) or "surround view monitor."

Further, the second sensor 11 should just be a sensor that can detect an obstacle existing in front of the host vehicle 1, and is not limited to the forward-photographing camera 10. In a case in which the display device 20 is constituted by the display 21 and the second sensor 11 is constituted by a sensor different from the forward-photographing camera 10, it is preferable to dispose the forward-photographing camera 10 independently from the second sensor 11 from the viewpoint that the front image is displayed by the display 21.

Further, the host vehicle 1 can have a system structure in which the second sensor 11, the obstacle detecting unit 12, and the parking candidate area detecting unit 13 which are shown in FIG. 1 are removed. In this case, the guide display by the display control unit 19 is the one in which the arrow image $D_L$ showing the parking candidate area is removed.

Further, the parking assist by the parking assist control unit 5 should just be one using the first sensor 4, and is not limited to the automatic parking by the automatic parking control unit 6. The parking assist by the parking assist control unit 5 can be, for example, one for displaying the detection result by the first sensor 4 on the display 21. As an alternative, the parking assist by the parking assist control unit 5 can be one for providing guidance on the detection result by the first sensor 4 with a sound output by using a not-illustrated speaker disposed in the host vehicle 1.

Further, the content of the guide display is not limited to any of the examples shown in FIGS. 6 to 9. The guide display can be any type of display as long as the guide display makes it possible to either notify the driver of the host vehicle 1 that the guide display is based on the effective detection range of the first sensor 4, and an obstacle existing in front of the host vehicle 1 is outside the effective detection range, or guide the host vehicle 1 in such a way that an obstacle existing in front of the host vehicle 1 enters the effective detection range. In Embodiment 2 mentioned later, another example of the guide display based on the first effective detection range will be explained. Further, in Embodiment 3 mentioned later, an example of a guide display based on a second effective detection range will be explained.

Further, the display control unit 19 can be the one that, when the host vehicle 1 has passed by the parking candidate area, causes the display device 20 to display a predetermined image showing the passage. As a result, the driver of the host vehicle 1 can visually grasp that the host vehicle 1 has passed by the parking candidate area, and direct his or her attention to the next parking candidate area.

Further, the display control unit 19 may enable display of both a guide display in which at least one of obstacles detected by the obstacle detecting unit 12 is inside the first effective detection range, and a guide display in which all obstacles detected by the obstacle detecting unit 12 are outside the first effective detection range, out of the left and right guide displays, in different modes. Concretely, for example, the display control unit 19 makes the latter guide display lighter in color, lower in the degree of lightness, or thinner in width than those of the former guide display.

Figure 4:
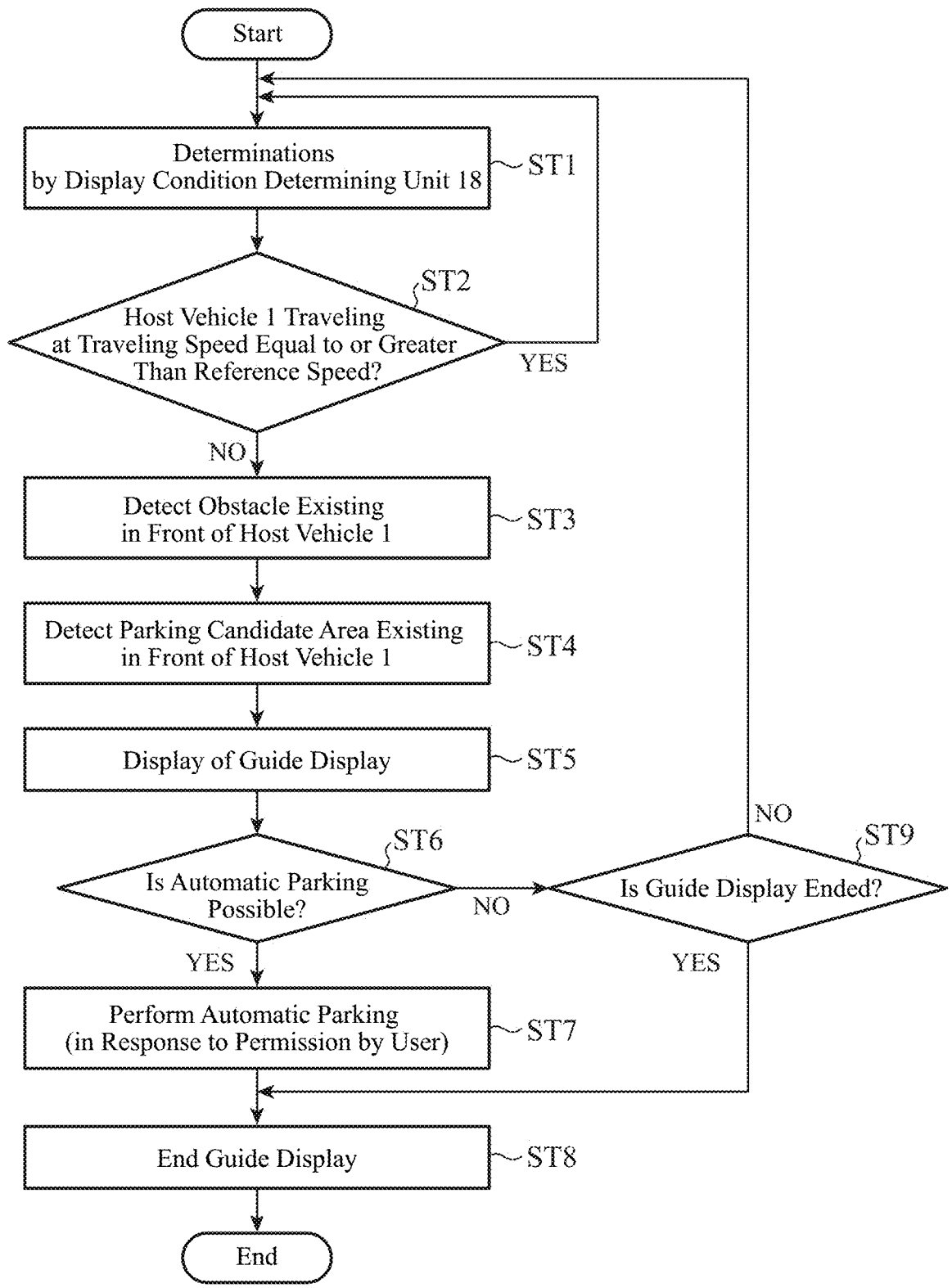
FIG. 4 is a flowchart showing the operation of the parking assist device according to Embodiment 1 of the present invention.

Further, in the flowchart of FIG. 4, the process in step ST1 of, when the current position of the host vehicle 1 is on a road, determining whether or not the road has an opposite lane, and the process in step ST5 of, when the road has an opposite lane, setting a guide display on a side of the opposite lane, out of the left and right guide displays, to non-display are not indispensable. In a case in which these processes are not performed, the storage device 16 and the GPS receiver 17 which are shown in FIG. 1 are unnecessary.

Further, although in the flowchart of FIG. 4 the example of starting the guide display when the host vehicle 1 is stationary or when the host vehicle 1 is traveling at a traveling speed less than the reference speed ("NO" in step ST2) is shown, the start condition of the guide display is not limited to this example. The display control unit 19 can start the guide display when an operation of instructing a start of the guide display is inputted to the not-illustrated input device. Further, the display control unit 19 can determine the presence or absence of another vehicle currently being parked in each of areas on the left and right of the host vehicle 1, by using the detection result of the obstacle detecting unit 12, and set the guide display on the side where no other vehicle currently being parked exists, out of the left and right guide displays, to non-display.

Further, the speed sensor 14 and the shift position sensor 15 can be connected to the parking assist control unit 5, and the parking assist control unit 5, instead of the display condition determining unit 18, can perform some of the determinations in step ST1, and a result of this determination can be inputted to the display condition determining unit 18.

As mentioned above, the parking assist device 100 of Embodiment 1 includes the parking assist control unit 5 that performs parking assist for the host vehicle 1 by using the first sensor 4 for parking assist disposed in the host vehicle 1, and the guide display control unit 24 that causes the display device 20 to display a guide display based on the first effective detection ranges $A_L$ and $A_R$ of the first sensor 4 in a state in which the guide display is superimposed on a front view with respect to the host vehicle 1. As a result, when the parking assist is performed, an obstacle which is an object to be detected by the first sensor 4 can be prevented from being outside the first effective detection range $A_L$ or $A_R$, and the reliability of the parking assist can be improved.

Further, the parking assist control unit 5 performs the automatic parking of the host vehicle 1 by using the first sensor 4. As a result, the reliability of the automatic parking can be improved.

Further, the guide display shows the outer edges $A_{LO}$ and $A_{RO}$ of the first effective detection ranges $A_L$ and $A_R$ with respect to the host vehicle 1. As a result, the driver of the host vehicle 1 can visually grasp the outer edges $A_{LO}$ and $A_{RO}$ of the first effective detection ranges $A_L$ and $A_R$.

Further, the guide display shows the outer edges $A_{LO}$ and $A_{RO}$ and the inner edges $A_{LI}$ and $A_{RI}$ of the first effective detection ranges $A_L$ and $A_R$ with respect to the host vehicle 1. As a result, the driver of the host vehicle 1 can visually grasp the inner edges $A_{LI}$ and $A_{RI}$ of the first effective detection ranges $A_L$ and $A_R$.

Further, the guide display shows the belt-shaped images $E_L$ and $E_R$ corresponding to the first effective detection ranges $A_L$ and $A_R$, and the guide display control unit 24 enables display of parts of the belt-shaped images $E_L$ and $E_R$, the parts including the outer edges $A_{LO}$ and $A_{RO}$, and the remaining parts in different modes. By providing the guide display illustrated in FIGS. 8 and 9, the outer edges $A_{LO}$ and $A_{RO}$ of the first effective detection ranges $A_L$ and $A_R$ can be displayed visually and intelligibly.

Further, the guide display includes the left guide display based on the first effective detection range $A_L$ on the left of the host vehicle 1, and the right guide display based on the first effective detection range $A_R$ on the right of the host vehicle 1, and the guide display control unit 24 enables display of a guide display including a parking candidate area which is a candidate for a parkable area for the host vehicle 1 and based on the first effective detection range $A_L$ or $A_R$, and a guide display not including the parking candidate area and based on the first effective detection range $A_L$ or $A_R$, out of the left and right guide displays, in different modes. As a result, the driver of the host vehicle 1 can grasp visually and intelligibly whether the parking candidate area exists either on the left or on the right.

As an alternative, the guide display includes the left guide display based on the first effective detection range $A_L$ on the left of the host vehicle 1, and the right guide display based on the first effective detection range $A_R$ on the right of the host vehicle 1, and the guide display control unit 24 sets a guide display not including a parking candidate area which is a candidate for a parkable area for the host vehicle 1 and based on the first effective detection range $A_L$ or $A_R$, out of the left and right guide displays, to non-display. As a result, the driver of the host vehicle 1 can grasp visually and intelligibly whether the parking candidate area exists either on the left or on the right.

Further, when the host vehicle 1 is stationary or when the host vehicle 1 is traveling at a traveling speed less than the reference speed, the guide display control unit 24 enables display of the guide display. More specifically, there is a high probability that when the host vehicle 1 is traveling at a traveling speed equal to or greater than the reference speed, the driver of the host vehicle 1 does not have an intention of parking. By setting the guide display to non-display in such a case, the guide display unnecessary for the driver can be prevented from being displayed.

Further, the guide display includes the left guide display based on the first effective detection range $A_L$ on the left of the host vehicle 1, and the right guide display based on the first effective detection range $A_R$ on the right of the host vehicle 1, and, when the position of the host vehicle 1 is on a road and the road has an opposite lane, the guide display control unit 24 sets a guide display on a side of the opposite lane, out of the left and right guide displays, to non-display. In general, there is a high probability that when the host vehicle 1 is traveling along a road, a parking lot existing on a side of the opposite lane is difficult or impossible to use for parking. By setting the guide display on a side of the opposite lane to non-display, the guide display whose degree of importance is low for the driver can be prevented from being displayed.

Embodiment 2

Figure 10:
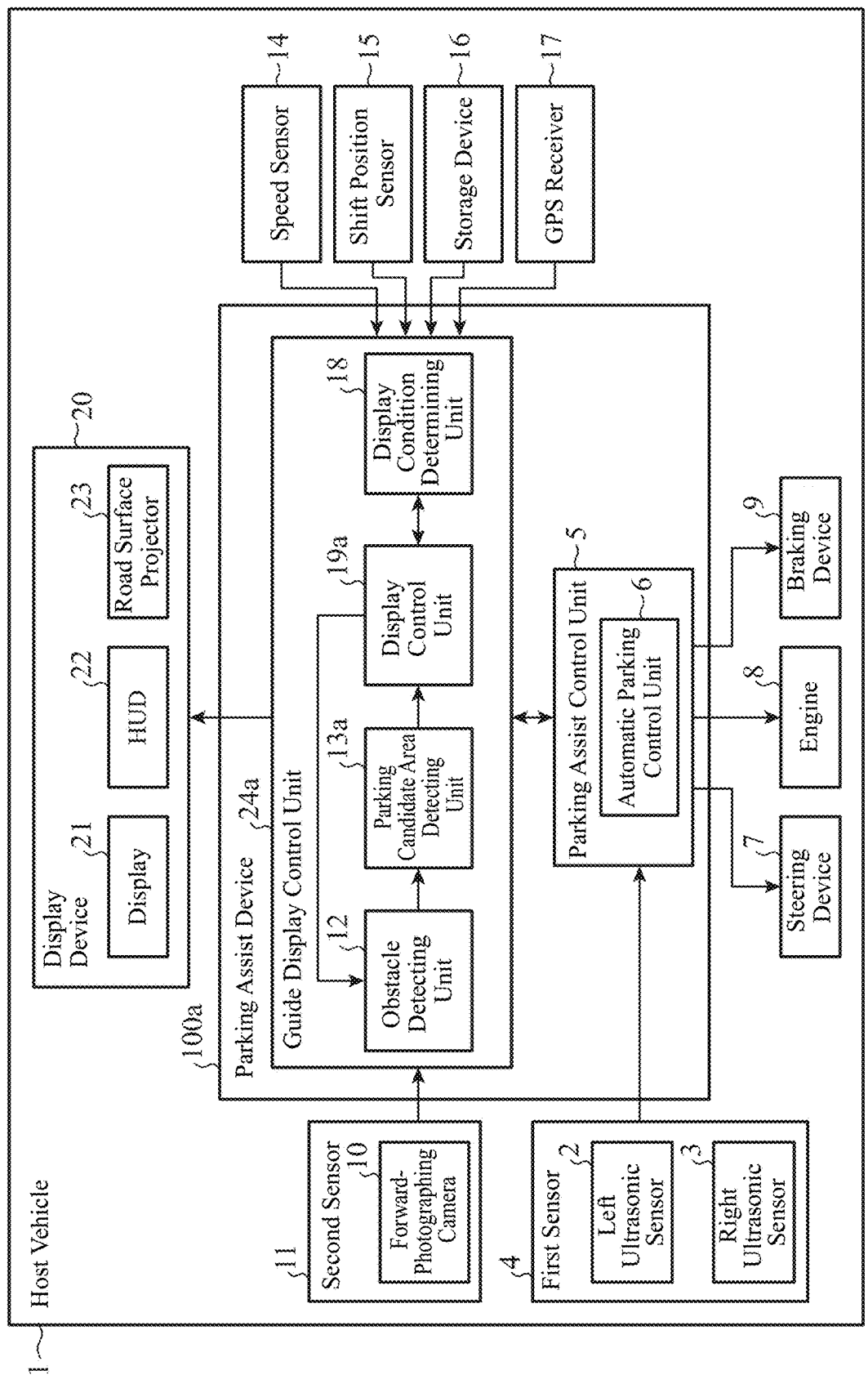
FIG. 10 is a functional block diagram showing a main part of a parking assist device according to Embodiment 2 of the present invention.

FIG. 10 is a functional block diagram showing a main part of a parking assist device according to Embodiment 2 of the present invention. The parking assist device 100a of Embodiment 2 will be explained by reference to FIG. 10. In FIG. 10, the same blocks as those in the functional block diagram of Embodiment 1 shown in FIG. 1 are denoted by the same reference numerals, and an explanation of the blocks will be omitted.

A parking candidate area detecting unit 13a detects a parking candidate area by using a detection result by an obstacle detecting unit 12. Because a concrete method of detecting a parking candidate area is the same as that of the parking candidate area detecting unit 13 shown in FIG. 1, an explanation of the method will be omitted. The parking candidate area detecting unit 13a outputs a front image, the detection result by the obstacle detecting unit 12, and a detection result by the parking candidate area detecting unit 13a to a display control unit 19a.

The display control unit 19a causes a display device 20 to display a guide display. The display control unit 19a enables display of the guide display in accordance with a determination result by a display condition determining unit 18, like the display control unit 19 shown in FIG. 1. Further, the display control unit 19a may enable display of the guide display in accordance with the detection result by the parking candidate area detecting unit 13a, like the display control unit 19 shown in FIG. 1. Further, the display control unit 19a may acquire information showing a current steering angle from a steering device 7 and enable display of the guide display in accordance with the steering angle, like the display control unit 19 shown in FIG. 1.

Further, the display control unit 19a may enable display of the guide display in accordance with the detection result by the obstacle detecting unit 12. Concretely, for example, information showing first effective detection ranges $A_L$ and $A_R$ are stored in advance in the display control unit 19a. By using the information showing the first effective detection ranges $A_L$ and $A_R$, the detection result by the obstacle detecting unit 12, the detection result being inputted from the parking candidate area detecting unit 13a, and the information acquired from the steering device 7 and showing the current steering angle, the display control unit 19a detects an obstacle which is outside the first effective detection range $A_L$ or $A_R$ when a host vehicle 1 is traveling in a state of maintaining the current steering angle, out of obstacles detected by the obstacle detecting unit 12. When such an obstacle is detected, the display control unit 19a causes the display device 20 to display a predetermined image (referred to as a "warning image" hereinafter) which is superimposed on the obstacle.

As an alternative, when there exists an obstacle outside the first effective detection range $A_L$ or $A_R$, out of the obstacles detected by the obstacle detecting unit 12, when the host vehicle 1 is traveling in the state of maintaining the current steering angle, the display control unit 19a calculates a travel path (referred to as a "recommended path" hereinafter) of the host vehicle 1 which makes it possible to cause the obstacle to enter the first effective detection range $A_L$ or $A_R$. The display control unit 19a causes the display device 20 to display an image showing the calculated recommended path.

A guide display control unit 24a is constituted by the obstacle detecting unit 12, the parking candidate area detecting unit 13a, the display condition determining unit 18, and the display control unit 19a. The parking assist device 100a is constituted by a parking assist control unit 5 and the guide display control unit 24a.

Because the hardware configuration of the parking assist device 100a is the same as that of the parking assist device 100 shown in FIG. 2 or 3, an illustration and an explanation of the hardware configuration will be omitted. Further, because the operation of the parking assist device 100a is the same as that explained by reference to the flowchart of FIG. 4 in Embodiment 1, an illustration and an explanation of the operation will be omitted.

Hereafter, a guide display by the guide display control unit 24a will be explained by reference to FIGS. 11 to 15. All of FIGS. 11 to 15 show an example in which the host vehicle 1 is a so-called "right-hand drive" four-wheel vehicle, and an HUD 22 is used as the display device 20. More specifically, in the figures, 41 denotes the windshield of the host vehicle 1, 42 denotes the window frame section of the windshield 41, and 43 denotes the steering wheel of the host vehicle 1. Further, in all of FIGS. 11 to 15, an illustration of a right guide display is omitted. The right guide display omitted in each of the figures is the same as that which is acquired by horizontally flipping a left guide display in each of the figures.

The guide display shown in FIG. 11 includes an arrow image C showing the traveling direction of the host vehicle 1 and a belt-shaped image $E_L$ showing the locus of the first effective detection range $A_L$. More specifically, the arrow image C is the same as that shown in FIGS. 6 and 7, and the belt-shaped image $E_L$ is the same as that shown in FIGS. 8 and 9.

Figure 11A:
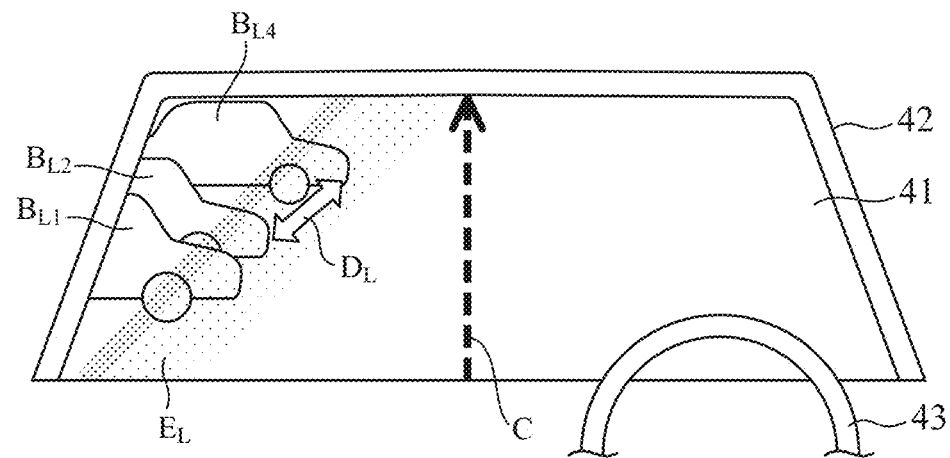
FIG. 11A is an explanatory drawing showing a state in which a guide display according to Embodiment 2 of the present invention is displayed on an HUD.

FIG. 11A shows a state in which all of other vehicles $B_{L1}$, $B_{L2}$, and $B_{L4}$ in left-side spaces in front enter the first effective detection range $A_L$ when the host vehicle 1 is traveling along the arrow image C. In this case, the guide display can include an arrow image $D_L$ showing a parking candidate area in addition to the arrow image C and the belt-shaped image $E_L$. The arrow image $D_L$ is the same as that shown in FIGS. 6 and 7.

Figure 11B:
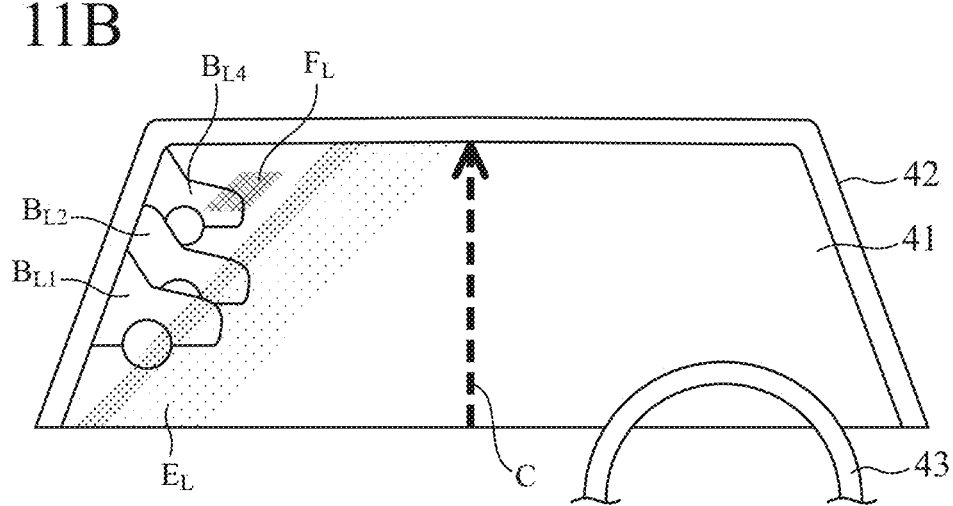
FIG. 11B is an explanatory drawing showing a state in which another guide display according to Embodiment 2 of the present invention is displayed on the HUD.

In contrast, FIG. 11B shows a state in which the other vehicle $B_{L4}$ is outside the first effective detection range $A_L$ when the host vehicle 1 is traveling along the arrow image C. In this case, the guide display includes a warning image $F_L$ superimposed on the other vehicle $B_{L4}$ in addition to the arrow image C and the belt-shaped image $E_L$. In the example of FIG. 11B, the warning image $F_L$ has a quadrangular shape in a color different from that of the belt-shaped image $E_L$.

The left guide display can show a linear image corresponding to only a part (i.e., a part displayed in a color darker than that of the remaining part) of the belt-shaped image $E_L$ shown in FIG. 11, the part including an outer edge $A_{LO}$. An example of the linear picture $G_L$ in this case is shown in FIG. 12.

Further, the left guide display can show an image (referred to as an "area image" hereinafter) which occupies an area between this linear image $G_L$ and the arrow image C, in addition to the linear image $G_L$ shown in FIG. 12. An example of the area image $H_L$ in this case is shown in FIG. 13.

Figure 12:
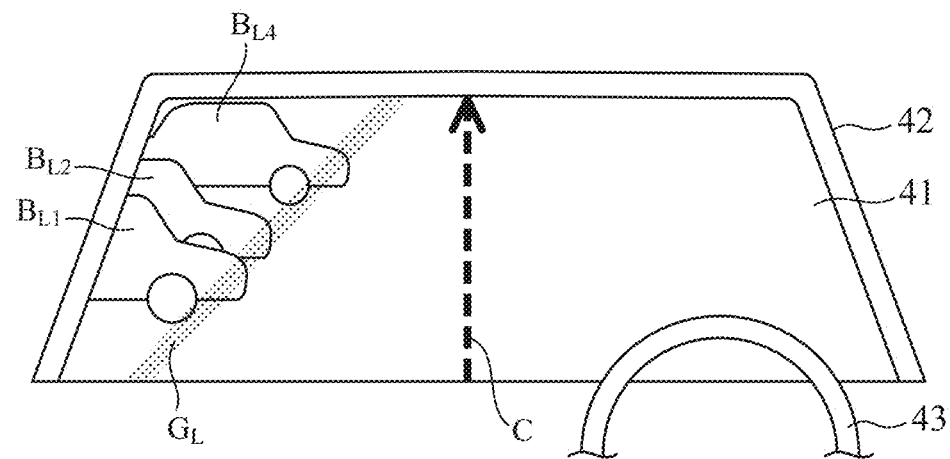
FIG. 12 is an explanatory drawing showing a state in which another guide display according to Embodiment 2 of the present invention is displayed on the HUD.
Figure 13:
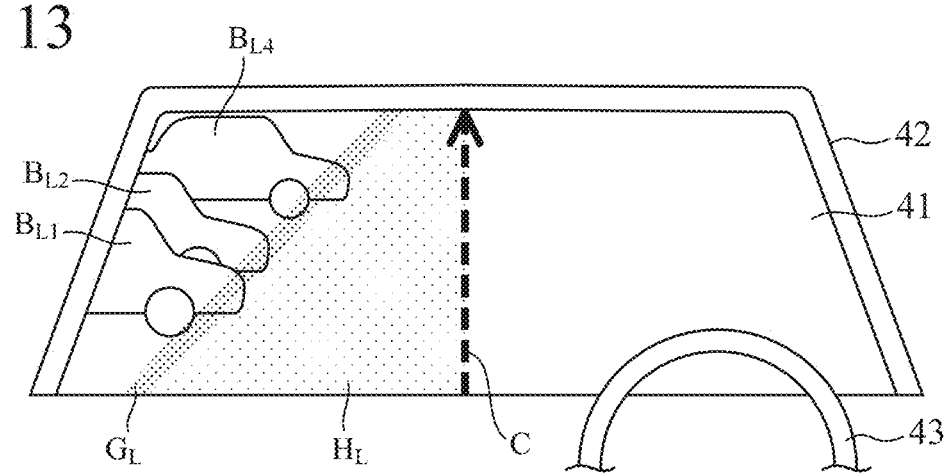
FIG. 13 is an explanatory drawing showing a state in which another guide display according to Embodiment 2 of the present invention is displayed on the HUD.

The guide display shown in FIG. 14 includes an arrow image C showing the traveling direction of the host vehicle 1, like the examples of FIGS. 11 to 13. In addition, the guide display shown in FIG. 14 shows quadrilateral images $I_L$ corresponding to parts of the first effective detection range $A_L$, the parts including the outer edge $A_{LO}$, while superimposing one of the quadrilateral images $I_L$ on each of the other vehicles $B_{L1}$, $B_{L2}$, and $B_{L4}$ which enter the first effective detection range $A_L$ as the host vehicle 1 travels.

Figure 14A:
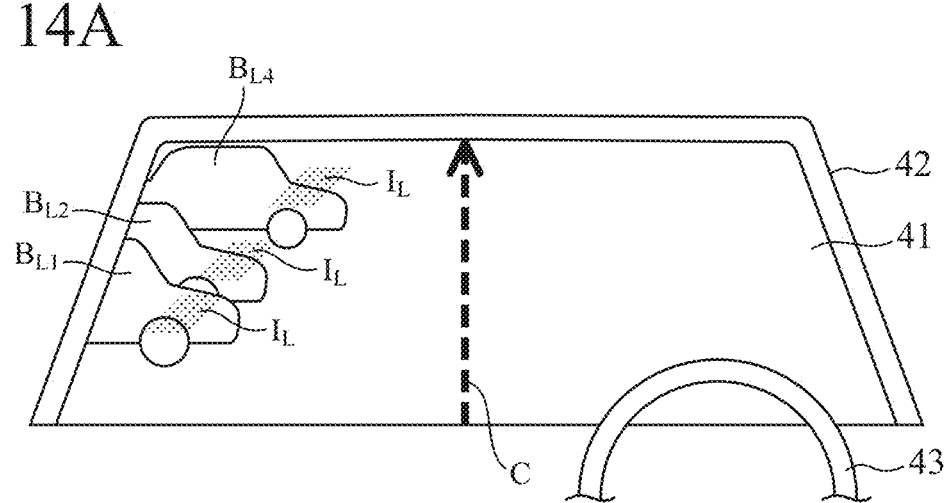
FIG. 14A is an explanatory drawing showing a state in which another guide display according to Embodiment 2 of the present invention is displayed on the HUD.

FIG. 14A shows a state in which all of the other vehicles $B_{L1}$, $B_{L2}$, and $B_{L4}$ in left-side spaces in front enter the first effective detection range $A_L$ when the host vehicle 1 is traveling along the arrow image C. In this case, the quadrilateral images $I_L$ are displayed while one of them is superimposed on each of the other vehicles $B_{L1}$, $B_{L2}$, and $B_{L4}$.

Figure 14B:
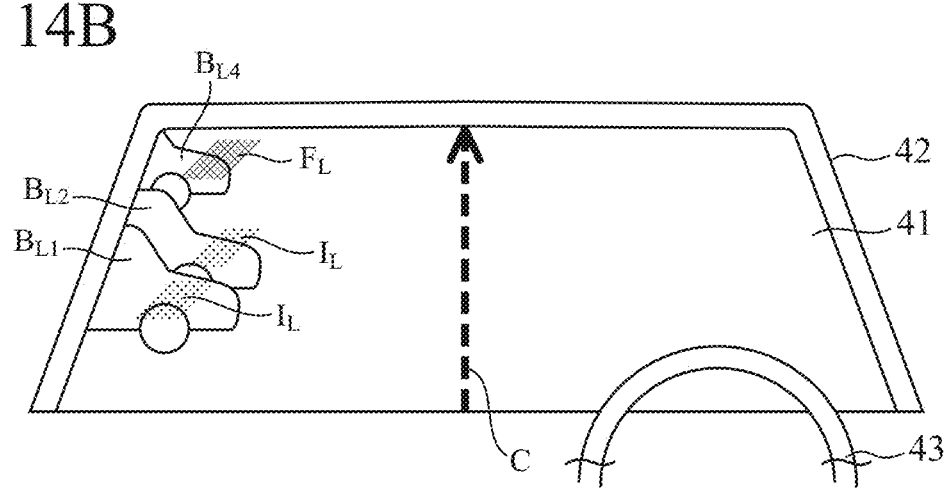
FIG. 14B is an explanatory drawing showing a state in which another guide display according to Embodiment 2 of the present invention is displayed on the HUD.

In contrast, FIG. 14B shows a state in which the other vehicle $B_{L4}$ is outside the first effective detection range $A_L$ when the host vehicle 1 is traveling along the arrow image C. In this case, a quadrilateral image $I_L$ is displayed while being superimposed on each of the other vehicles $B_{L1}$ and $B_{L2}$ inside the first effective detection range $A_L$. In contrast, on the other vehicle $B_{L4}$ outside the first effective detection range $A_L$, the same warning image $F_L$ as that of FIG. 11B, instead of a quadrilateral image $I_L$, is superimposed and displayed.

Figure 15:
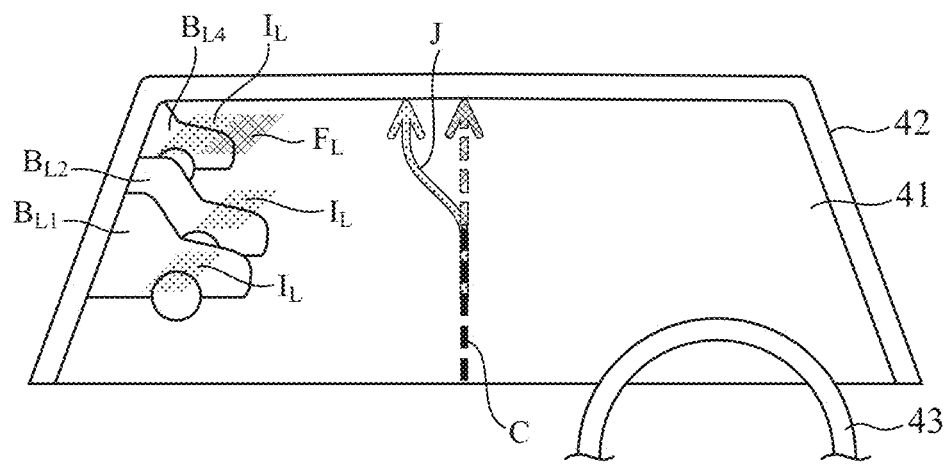
FIG. 15 is an explanatory drawing showing a state in which another guide display according to Embodiment 2 of the present invention is displayed on the HUD.

Further, when the other vehicle $B_{L4}$ is outside the first effective detection range $A_L$, as shown in FIG. 14B, the display control unit 19a can determine a recommended path which makes it possible to cause the other vehicle $B_{L4}$ to enter the first effective detection range $A_L$, to cause the display device 20 to display a guide display including this recommended path. An example of the guide display in this case is shown in FIG. 15. In FIG. 15, an arrow image J shows the recommended path.

Further, at this time, the display control unit 19a may enable display of both a warning image $F_L$ and a quadrilateral image $I_L$ with these images being apart from each other while superimposing the images on the other vehicle $B_{L4}$. By providing both the display mode of the arrow image J with respect to that of the arrow image C, and the display mode of the quadrilateral image $I_L$ with respect to that of the warning image $F_L$ with a common feature (for example, by displaying the arrow image C and the warning image $F_L$ in an identical color and displaying the arrow image J and the quadrilateral image $I_L$ in an identical color different from the former color, and also displaying the quadrilateral image $I_L$ on the left of the warning image $F_L$), the driver of the host vehicle 1 can be notified visually and intelligibly that, when driving in accordance with the arrow image C, the other vehicle $B_{L4}$ is outside the first effective detection range $A_L$, and, when driving in accordance with the arrow image J (recommended path), the other vehicle $B_{L4}$ enters the first effective detection range $A_L$.

The display control unit 19a can implement the same guide display as that shown in each of FIGS. 11 to 15 by using a display 21. As an alternative, the display control unit 19a can implement the same guide display as that shown in each of FIGS. 11 to 15 by using a road surface projector 23. In a case in which the display device 20 is the display 21 or the HUD 22, the actually-displayed shapes of the warning image $F_L$ and each quadrilateral image $I_L$ are parallelogrammatic, and their shapes which are seen from the driver of the host vehicle 1 are also parallelogrammatic. In a case in which the display device 20 is the road surface projector 23, the actually-displayed shapes of the warning image $F_L$ and each quadrilateral image $I_L$ are rectangular, while their shapes which are seen from the driver of the host vehicle 1 are parallelogrammatic.

Further, the guide display by the guide display control unit 24a is not limited to the examples shown in FIGS. 11 to 15. The guide display can be any type of display as long as the guide display makes it possible to either notify the driver of the host vehicle 1 that the guide display is based on the effective detection range of a first sensor 4, and an obstacle existing in front of the host vehicle 1 is outside the effective detection range, or guide the host vehicle 1 in such a way that an obstacle existing in front of the host vehicle 1 enters the effective detection range.

In addition, each of the same various variants as those explained in Embodiment 1 can be used as the parking assist device 100a of Embodiment 2.

As mentioned above, the parking assist device 100a of Embodiment 2 includes the parking assist control unit 5 that performs parking assist for the host vehicle 1 by using the first sensor 4 for parking assist disposed in the host vehicle 1, and the guide display control unit 24a that causes the display device 20 to display a guide display based on the first effective detection ranges $A_L$ and $A_R$ of the first sensor 4 in a state in which the guide display is superimposed on a front view with respect to the host vehicle 1. As a result, the reliability of the parking assist can be improved, like in the case of the parking assist device 100 of Embodiment 1.

Further, the guide display control unit 24a detects an obstacle existing in front of the host vehicle 1 by using the second sensor 11 disposed in the host vehicle 1, and enables display of the guide display in accordance with a result of the detection of the obstacle. As a result, the guide display corresponding to obstacles, such as the other vehicles $B_{L1}$, $B_{L2}$, and $B_{L4}$, can be displayed.

Further, the guide display control unit 24a enables display of the guide display based on the first effective detection ranges $A_L$ and $A_R$ relative to the host vehicle 1, and the guide display is display in which a quadrilateral image $I_L$ corresponding to the first effective detection range $A_L$ or $A_R$ is displayed while the quadrilateral image is superimposed on each obstacle inside the first effective detection range $A_L$ or $A_R$. As a result, it is possible to visually and intelligibly display whether or not each obstacle existing in front of the host vehicle 1 is inside the first effective detection range $A_L$ or $A_R$.

Further, the guide display is the one in which the warning image $F_L$ is displayed while this warning image is superimposed on each obstacle outside the first effective detection range $A_L$ or $A_R$. As a result, each obstacle outside the first effective detection range $A_L$ or $A_R$, out of the obstacles existing in front of the host vehicle 1, can be displayed visually and intelligibly.

Further, the guide display shows a recommended path of the host vehicle 1. By displaying the arrow image J, when the host vehicle 1 is traveling in the state of maintaining the current steering angle and an obstacle outside the first effective detection range $A_L$ or $A_R$ exists, a recommended path which makes it possible to cause this obstacle to enter the first effective detection range $A_L$ or $A_R$ can be displayed visually and intelligibly.

Embodiment 3

Figure 16:
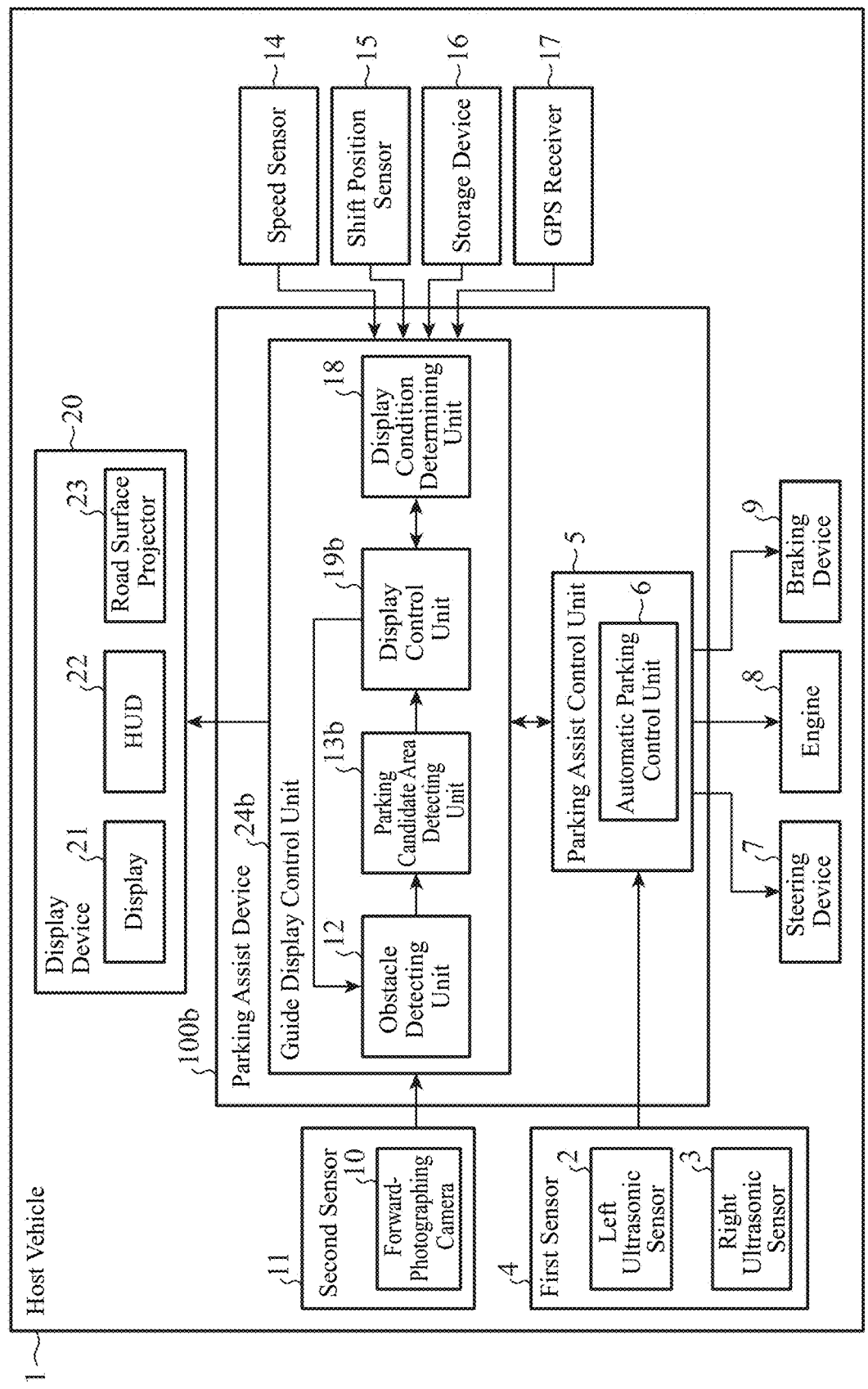
FIG. 16 is a functional block diagram showing a main part of a parking assist device according to Embodiment 3 of the present invention.

FIG. 16 is a functional block diagram showing a main part of a parking assist device according to Embodiment 3 of the present invention. The parking assist device 100b of Embodiment 3 will be explained by reference to FIG. 16. In FIG. 16, the same blocks as those in the functional block diagram of Embodiment 1 shown in FIG. 1 are denoted by the same reference numerals, and an explanation of the blocks will be omitted.

A parking candidate area detecting unit 13b detects a parking candidate area by using a detection result by an obstacle detecting unit 12. Because a concrete method of detecting a parking candidate area is the same as that of the parking candidate area detecting unit 13 shown in FIG. 1, an explanation of the method will be omitted. The parking candidate area detecting unit 13b outputs a front image, the detection result by the obstacle detecting unit 12, and a detection result by the parking candidate area detecting unit 13b to a display control unit 19b.

The display control unit 19b causes a display device 20 to display a guide display. The display control unit 19b enables display of the guide display in accordance with a determination result by a display condition determining unit 18, like the display control unit 19 shown in FIG. 1. Further, the display control unit 19b may enable display of the guide display in accordance with the detection result by the parking candidate area detecting unit 13b, like the display control unit 19 shown in FIG. 1. Further, the display control unit 19b may acquire information showing a current steering angle from a steering device 7 and enable display of the guide display in accordance with the steering angle, like the display control unit 19 shown in FIG. 1.

Here, the guide display by the display control unit 19b is based on a second effective detection range relative to an obstacle, instead of or in addition to a first effective detection range relative to a host vehicle 1. Information showing the first effective detection range is stored in advance in the display control unit 19b. By using the information showing the first effective detection range, and the detection result by the obstacle detecting unit 12, the display control unit 19b determines the second effective detection range for each obstacle shown by the detection result. A concrete example of the second effective detection range will be mentioned later by reference to FIG. 17.

A guide display control unit 24b is constituted by the obstacle detecting unit 12, the parking candidate area detecting unit 13b, the display condition determining unit 18, and the display control unit 19b. The parking assist device 100b is constituted by a parking assist control unit 5 and the guide display control unit 24b.

Because the hardware configuration of the parking assist device 100b is the same as that of the parking assist device 100 shown in FIG. 2 or 3, an illustration and an explanation of the hardware configuration will be omitted. Further, because the operation of the parking assist device 100b is the same as that explained by reference to the flowchart of FIG. 4 in Embodiment 1, an illustration and an explanation of the operation will be omitted.

Next, an example of the second effective detection range will be explained by reference to FIG. 17. The first effective detection range $A_L$ shown in FIG. 17 is relative to the host vehicle 1, and is the same as each of those shown in FIG. 5 and so on.

In contrast with this, a range relative to an obstacle and having the same size as the first effective detection range $A_L$ is the second effective detection range $K_L$. In the example of FIG. 17, a range from 0 meters to 2.0 meters relative to a nose part of another vehicle $B_{L1}$ is the second effective detection range $K_L$. More specifically, the second effective detection range $K_L$ shows a range in which the obstacle can be normally detected with stability by using a left ultrasonic sensor 2 when the left ultrasonic sensor 2 enters the range as the host vehicle 1 travels.

Figure 17:
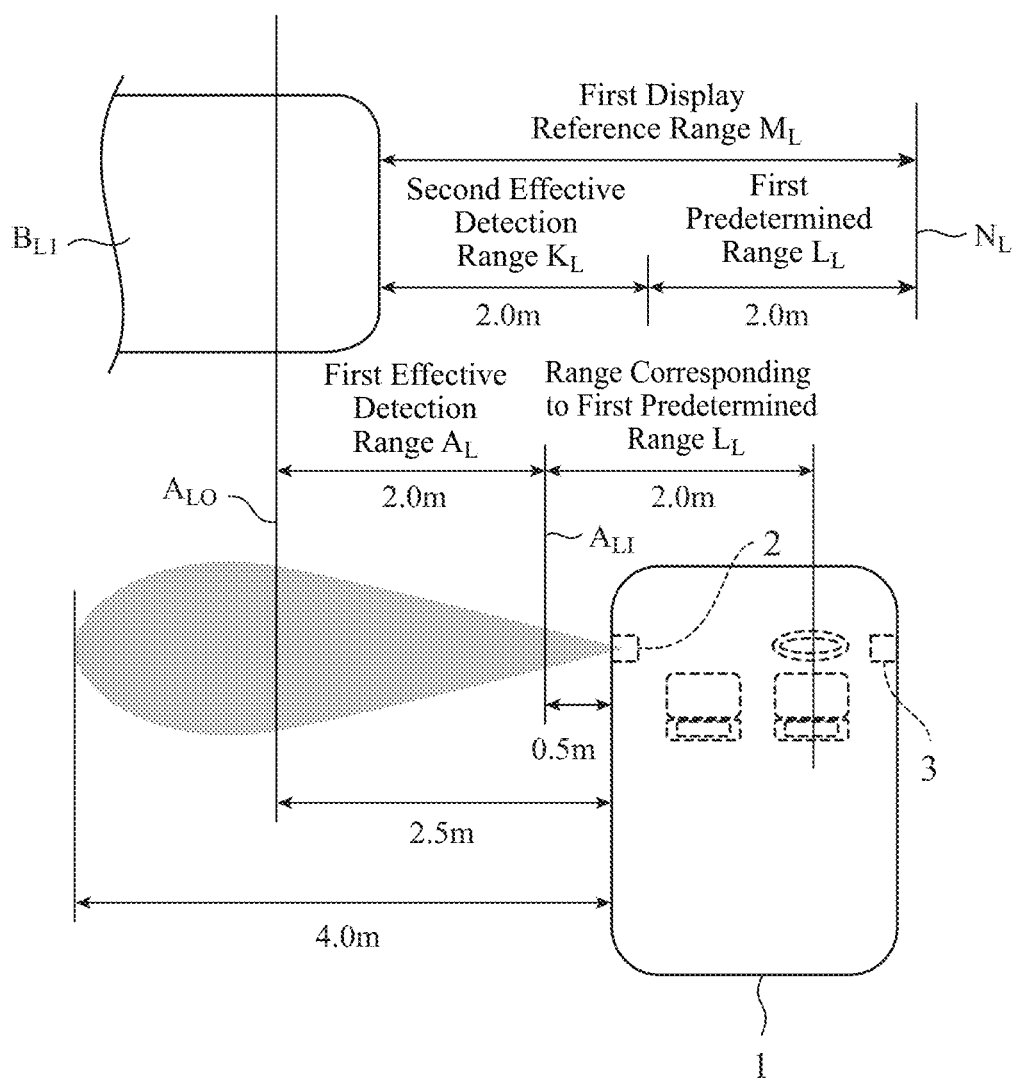
FIG. 17 is an explanatory drawing showing an example of a first effective detection range, a second effective detection range, a first predetermined range, and a first display reference range according to Embodiment 3 of the present invention.

Further, as shown in FIG. 17, a range which is the addition of a first predetermined range $L_L$ to the second effective detection range $K_L$ is referred to as a first display reference range $M_L$. The first predetermined range $L_L$ is set to, for example, a value (in the example of FIG. 17, 2.0 meters) corresponding to the spacing between an inner edge $A_{LI}$ of the first effective detection range $A_L$ and the driver's seat of the host vehicle 1. In the example of FIG. 17, an edge $N_L$ of the first display reference range $M_L$ on a side opposite to a side facing the other vehicle $B_{L1}$ is located on the right of a right side portion of the host vehicle 1.

Figure 18:
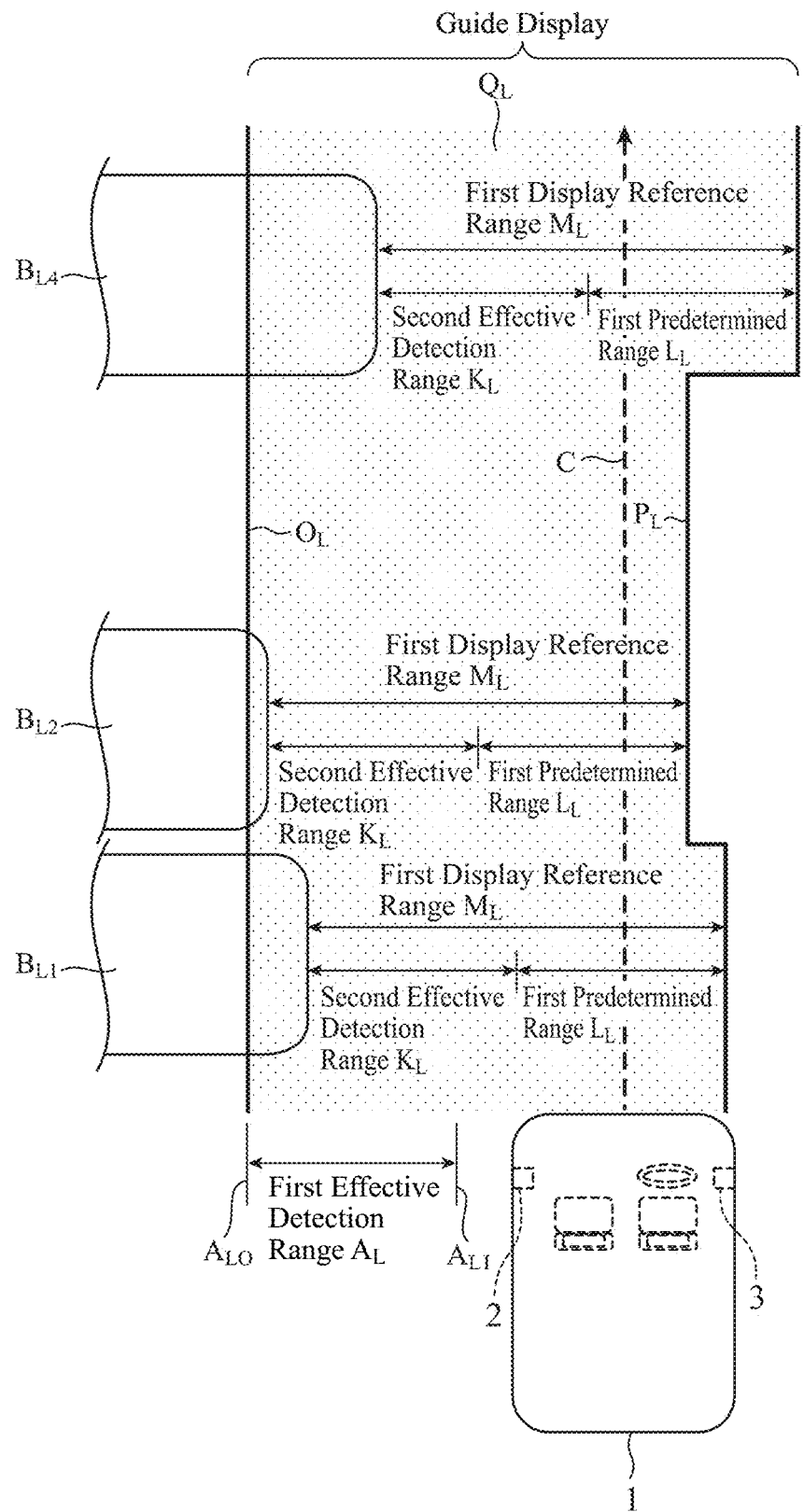
FIG. 18 is an explanatory drawing showing the content of a guide display according to Embodiment 3 of the present invention.

Next, examples of the guide display by the guide display control unit 24b will be explained by reference to FIGS. 18 to 21. In FIGS. 18 and 20, an arrow image C shows the traveling direction of the host vehicle 1 when the host vehicle 1 is traveling in a state of maintaining the current steering angle (in the examples of FIGS. 18 and 20, the host vehicle is going straight ahead). A linear image $O_L$ shows the locus of an outer edge $A_{LO}$ of the first effective detection range $A_L$ in this case. A linear image $P_L$ corresponds to line segments connecting the edge $N_L$ of the first display reference range $M_L$ relative to each of other vehicles $B_{L1}$, $B_{L2}$, and $B_{L4}$. An area image $Q_L$ shows an area between the linear images $O_L$ and $P_L$. The guide display is constituted by the arrow image C, the linear images $O_L$ and $P_L$, and the area image $Q_L$.

Figure 19:
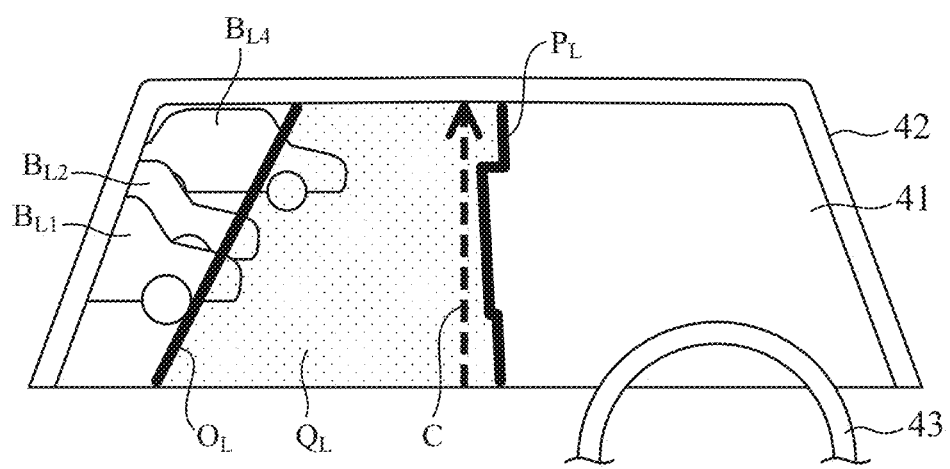
FIG. 19 is an explanatory drawing showing a state in which a guide display corresponding to the content of FIG. 18 is displayed on an HUD.
Figure 20:
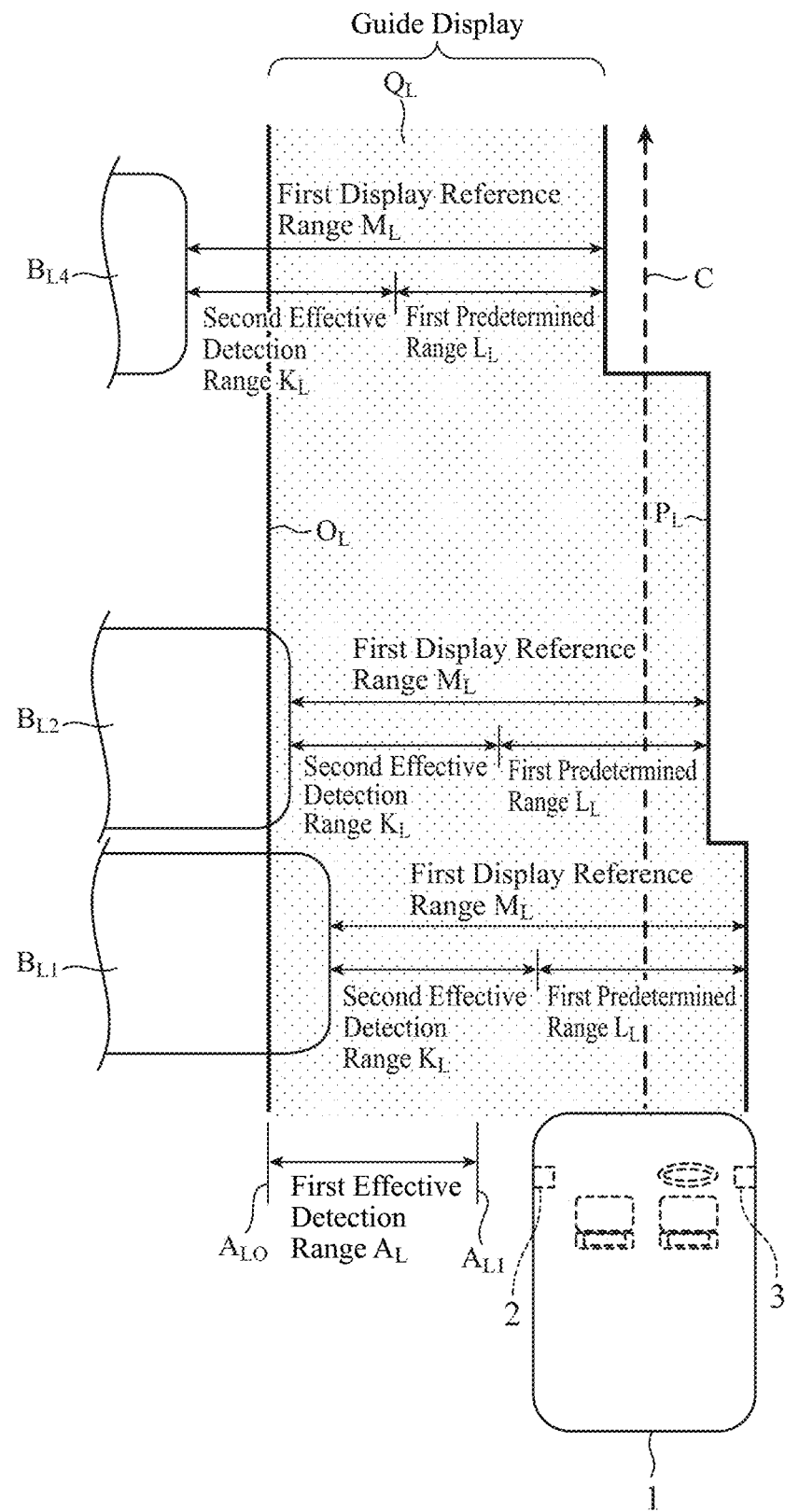
FIG. 20 is an explanatory drawing showing the content of another guide display according to Embodiment 3 of the present invention.
Figure 21:
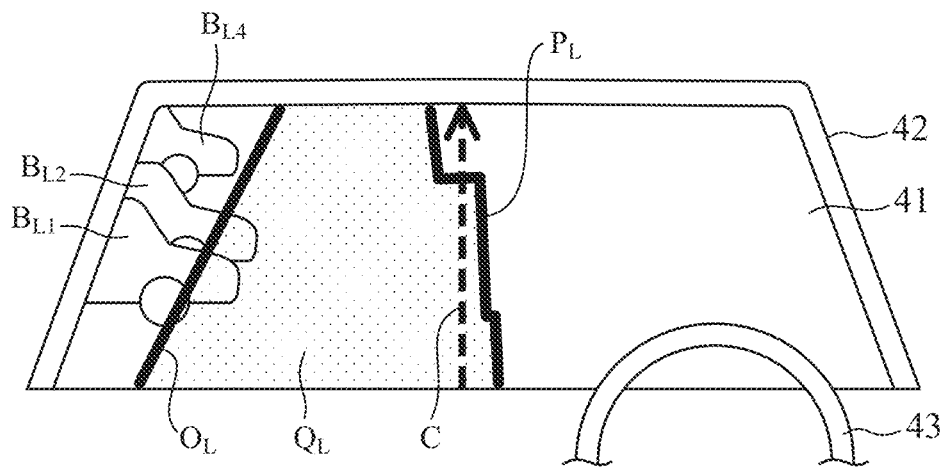
FIG. 21 is an explanatory drawing showing a state in which a guide display corresponding to the content of FIG. 20 is displayed on the HUD.

FIG. 19 shows a state in which the guide display corresponding to the content of FIG. 18 is displayed on an HUD 22. FIG. 21 shows a state in which the guide display corresponding to the content of FIG. 20 is displayed on the HUD 22.

FIGS. 18 and 19 show a state in which all of the other vehicles $B_{L1}$, $B_{L2}$, and $B_{L4}$ currently being parked in left-side spaces in front are inside the first effective detection range $A_L$. In this case, the linear image $O_L$ is superimposed on all of the other vehicles $B_{L1}$, $B_{L2}$, and $B_{L4}$, and the whole of the arrow image C is included in the area image $Q_L$.

In contrast, FIGS. 20 and 21 show a state in which the other vehicle $B_{L4}$ is outside the first effective detection range $A_L$. In this case, the other vehicle $B_{L4}$ is located outside from the linear image $O_L$, and a leading end portion of the arrow image C projects outside from the area image $Q_L$. From the guide display shown in FIG. 21, the driver of the host vehicle 1 can visually grasp that the other vehicle $B_{L4}$ can be caused to enter the first effective detection range $A_L$ by adjusting the traveling direction of the host vehicle 1 to a leftward direction.

Figure 22:
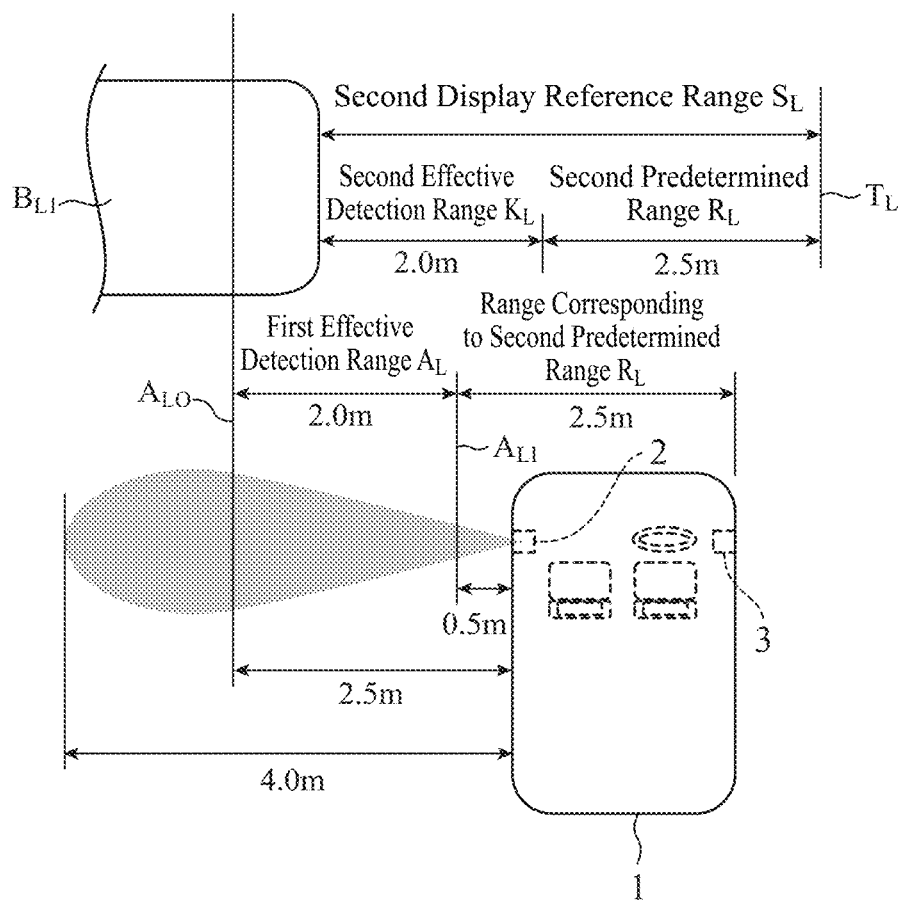
FIG. 22 is an explanatory drawing showing an example of a first effective detection range, a second effective detection range, a second predetermined range, and a second display reference range according to Embodiment 3 of the present invention.

Next, another example of the guide display by the guide display control unit 24b will be explained by reference to FIGS. 22 to 24. As shown in FIG. 22, a range which is the addition of a second predetermined range $R_L$ to the second effective detection range $K_L$ is referred to as a second display reference range $S_L$. The second predetermined range $R_L$ is set to, for example, a value (in the example of FIG. 22, 2.5 meters) corresponding to the spacing between the inner edge $A_{LI}$ of the first effective detection range $A_L$ and the right side portion of the host vehicle 1. In the example of FIG. 22, an edge $T_L$ of the second display reference range $S_L$ on a side opposite to a side facing the other vehicle $B_{L1}$ is located on the right of the right side portion of the host vehicle 1.

Figure 23:
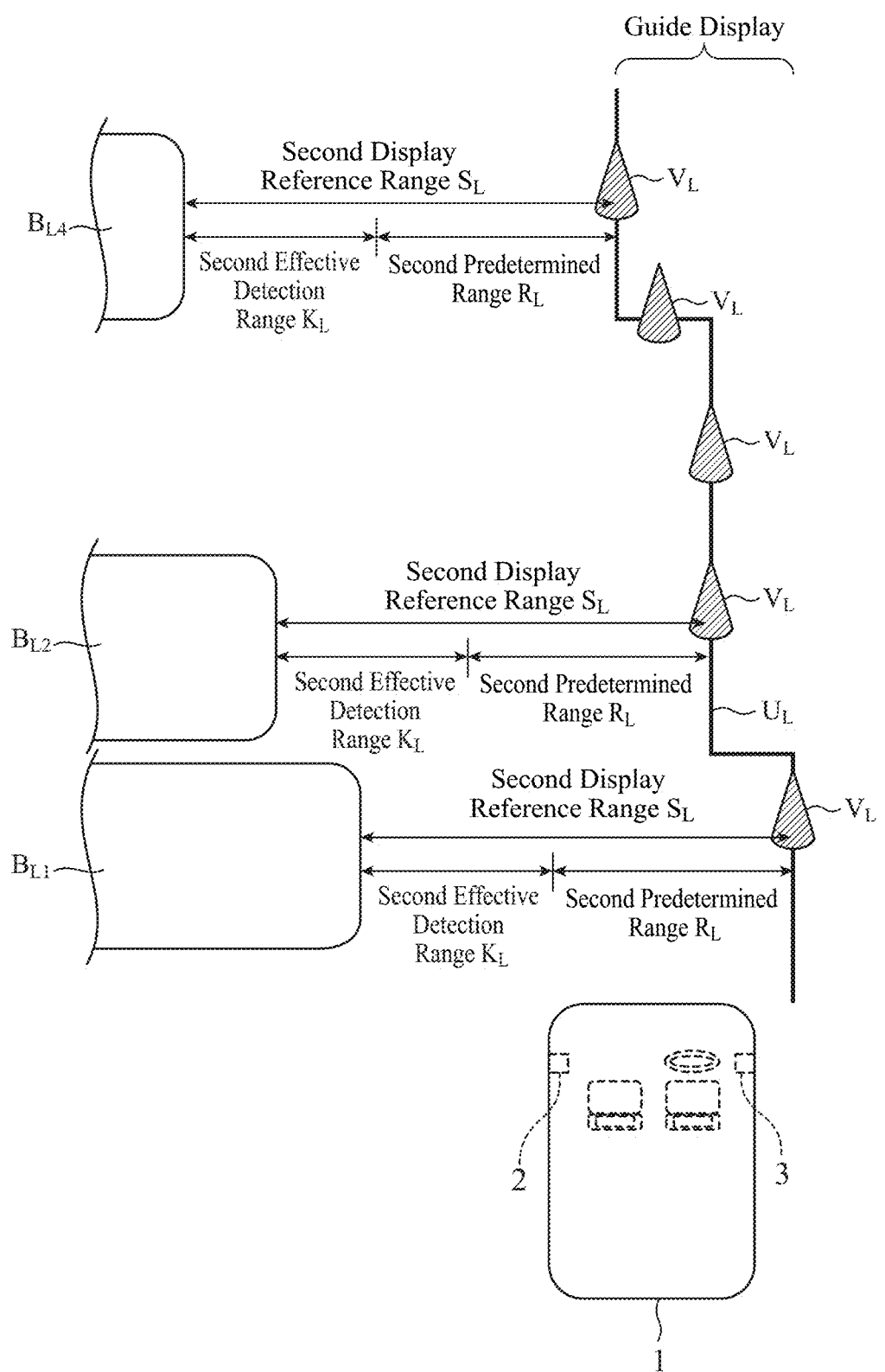
FIG. 23 is an explanatory drawing showing the content of another guide display according to Embodiment 3 of the present invention.
Figure 24:
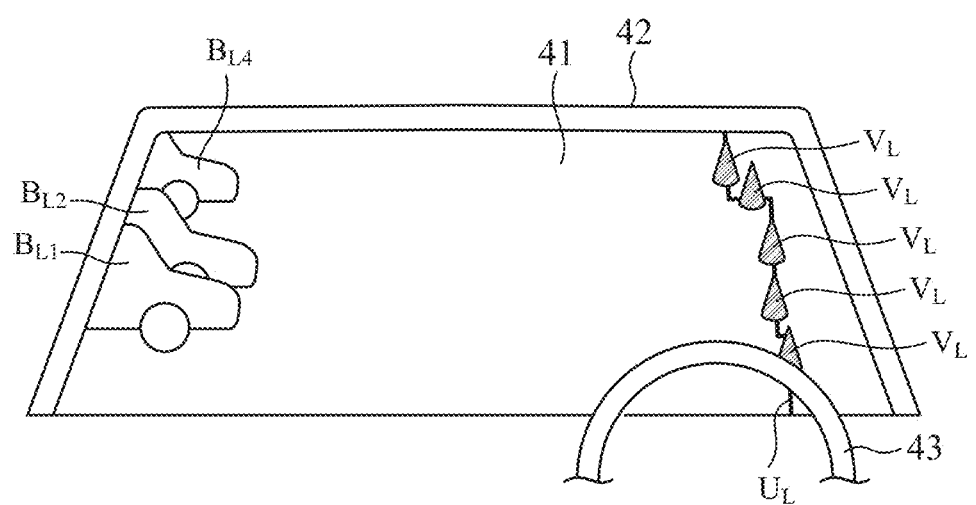
FIG. 24 is an explanatory drawing showing a state in which a guide display corresponding to the content of FIG. 23 is displayed on the HUD.

In this case, the guide display can include a linear image $U_L$ corresponding to line segments connecting the edge $T_L$ of the second display reference range $S_L$ relative to each of the other vehicles $B_{L1}$, $B_{L2}$, and $B_{L4}$ and images (referred to as "virtual obstacle images" hereinafter) $V_L$ of virtual obstacles arranged along the linear image $U_L$, as shown in FIGS. 23 and 24.

More specifically, each virtual obstacle image $V_L$ shows an image of an obstacle which does not exist actually, for the purpose of guiding the host vehicle 1. In the example of FIGS. 23 and 24, virtual obstacle images $V_L$ corresponding to plural road cones arranged along the linear image $U_L$ are displayed. It is to be expected that the driver of the host vehicle 1 who has visually recognized the virtual obstacle images $V_L$ adjusts the traveling direction of the host vehicle 1 to a leftward direction in order to avoid the virtual obstacles (road cones). As a result, the host vehicle 1 can be guided in such a way that the other vehicle $B_{L4}$ enters the first effective detection range $A_L$.

The first predetermined range $L_L$ is not limited to the value corresponding to the spacing between the inner edge $A_{LI}$ of the first effective detection range $A_L$ and the driver's seat of the host vehicle 1. The first predetermined range $L_L$ can be set to, for example, a value corresponding to the spacing between the inner edge $A_{LI}$ of the first effective detection range $A_L$ and the center of the host vehicle 1.

Further, the second predetermined range $R_L$ is not limited to the value corresponding to the spacing between the inner edge $A_{LI}$ of the first effective detection range $A_L$ and the right side portion of the host vehicle 1. The second predetermined range $R_L$ can be set to, for example, a value corresponding to the spacing between the inner edge $A_{LI}$ of the first effective detection range $A_L$ and the driver's seat of the host vehicle 1.

Further, the virtual obstacle images $V_L$ are not limited to the images of road cones. Each virtual obstacle image $V_L$ can be, for example, an image showing a groove, a level difference, or a crack disposed on a road surface.

Further, the display control unit 19b can implement either the same guide display as one of those illustrated in FIGS. 18 to 21 or the same guide display as that illustrated in FIGS. 23 and 24 by using a display 21. As an alternative, the display control unit 19b can implement either the same guide display as one of those illustrated in FIGS. 18 to 21 or the same guide display as that illustrated in FIGS. 23 and 24 by using a road surface projector 23.

Further, although in any of FIGS. 18 to 21, 23, and 24, an example of the guide display based on the second effective detection range $K_L$ relative to each of the obstacles (other vehicles $B_{L1}$, $B_{L2}$, and $B_{L4}$) on the left of the host vehicle 1 is shown, the display control unit 19b can display a guide display based on the second effective detection range relative to each of obstacles (other vehicles $B_{R1}$ to $B_{R4}$) on the right of the host vehicle 1, like in the case of these examples.

Further, the guide display by the guide display control unit 24b is not limited to the examples shown in FIGS. 18 to 21, and is not limited to the example shown in FIGS. 23 and 24. The guide display can be any type of display as long as the guide display makes it possible to either notify the driver of the host vehicle 1 that the guide display is based on the effective detection range of a first sensor 4, and an obstacle existing in front of the host vehicle 1 is outside the effective detection range, or guide the host vehicle 1 in such a way that an obstacle existing in front of the host vehicle 1 enters the effective detection range.

In addition, each of the same various variants as those explained in Embodiments 1 and 2 can be used as the parking assist device 100b of Embodiment 3.

As mentioned above, the parking assist device 100b of Embodiment 3 includes the parking assist control unit 5 that performs parking assist for the host vehicle 1 by using the first sensor 4 for parking assist disposed in the host vehicle 1, and the guide display control unit 24b that causes the display device 20 to display a guide display based on the second effective detection ranges $K_L$ and $K_R$ of the first sensor 4 in a state in which the guide display is superimposed on a front view with respect to the host vehicle 1. As a result, the reliability of the parking assist can be improved, like in the case of the parking assist device 100 of Embodiment 1 and in the case of the parking assist device 100a of Embodiment 2.

Further, the guide display control unit 24b detects an obstacle existing in front of the host vehicle 1 by using a second sensor 11 disposed in the host vehicle 1, and enables display of the guide display in accordance with a result of the detection of an obstacle. As a result, the guide display corresponding to obstacles, such as the other vehicles $B_{L1}$, $B_{L2}$, and $B_{L4}$, can be displayed.

Further, the guide display control unit 24b enables display of the guide display based on the second effective detection range $K_L$ relative to each obstacle, and the guide display shows both the traveling direction of the host vehicle 1, and the edge $N_L$ of the first display reference range $M_L$ including the second effective detection range $K_L$, the edge being on a side opposite to a side facing each obstacle. From each of the guide displays illustrated in FIGS. 18 to 21, the driver of the host vehicle 1 can visually grasp that an obstacle can be caused to enter the first effective detection range $A_L$ by determining to which one of leftward and rightward directions the traveling direction of the host vehicle 1 is to be adjusted.

As an alternative, the guide display control unit 24b enables display of the guide display based on the second effective detection range $K_L$ relative to each obstacle, and the guide display shows virtual obstacle images $V_L$ arranged along the edge $T_L$ of the second display reference range $S_L$ including the second effective detection range $K_L$, the edge being on a side opposite to a side facing each obstacle. By providing the guide display illustrated in FIGS. 23 and 24, the host vehicle 1 can be guided in such away that an obstacle existing in front of the host vehicle 1 enters the first effective detection range $A_L$.

While the invention has been described in its preferred embodiments, it is to be understood that any combination of two or more of the above-mentioned embodiments can be made, various changes can be made in any component according to any one of the above-mentioned embodiments, and any component according to any one of the above-mentioned embodiments can be omitted within the scope of the invention.

INDUSTRIAL APPLICABILITY

The parking assist device of the present invention can be used for parking assist for vehicles.

REFERENCE SIGNS LIST 1 host vehicle, 2 left ultrasonic sensor, 3 right ultrasonic sensor, 4 first sensor, 5 parking assist control unit, 6 automatic parking control unit, 7 steering device, 8 engine, 9 braking device, 10 forward-photographing camera, 11 second sensor, 12 obstacle detecting unit, 13, 13a, and 13b parking candidate area detecting unit, 14 speed sensor, 15 shift position sensor, 16 storage device, 17 GPS receiver, 18 display condition determining unit, 19, 19a, and 19b display control unit, 20 display device, 21 display, 22 HUD, 23 road surface projector, 24, 24a, and 24b guide display control unit, 31 processor, 32 memory, 33 processing circuit, 41 windshield, 42 window frame section, 43 steering wheel, and 100, 100*a*, and 100*b* parking assist device.

The invention claimed is:

1. A parking assist device comprising:
a processor; and
a memory storing instructions which, when executed by the processor, causes the processor to perform processes of:
performing parking assist for a vehicle by using a first sensor for parking assist disposed in the vehicle; and
causing a display device to display a guide display based on an effective detection range of the first sensor in a state in which the guide display is superimposed on a front view with respect to the vehicle,
wherein the guide display shows information about the effective detection range, and shows an outer edge of the effective detection range on the front view that extends linearly and is superimposed on an obstacle that is within the effective detection range, the outer edge being set with respect to the vehicle,
the processor enables display of the guide display when the vehicle is stationary or when the vehicle is traveling at a traveling speed less than a reference speed, and
the guide display includes a left guide display based on the effective detection range on a left of the vehicle, and a right guide display based on the effective detection range on a right of the vehicle, and
when a position of the vehicle is on a road and this road has an opposite lane, the guide display on a side of the opposite lane, out of the left and right guide displays, is set to non-display.

2. The parking assist device according to claim 1, wherein the processor performs automatic parking of the vehicle by using the first sensor.

3. The parking assist device according to claim 1, wherein the guide display shows the outer edge and an inner edge of the effective detection range, the outer and inner edges being set with respect to the vehicle.

4. The parking assist device according to claim 3, wherein the guide display includes a belt-shaped image corresponding to the effective detection range, and
the processor enables display of both a part of the belt-shaped image, the part including the outer edge, and a remaining part in different modes.

5. The parking assist device according to claim 1, wherein the effective detection range includes a left effective detection range with respect to the vehicle and a right effective detection range with respect to the vehicle,
the guide display includes a left guide display based on the left effective detection range and a right guide display based on the right effective detection range, and
when a parking candidate area which is a candidate for a parkable area of the vehicle is included in any one of the left effective detection range and the right effective detection range, and when the parking candidate area is not included in any other of the left effective detection range and the tight effective detection range, the processor enables display of left guide display and the right guide display in different modes.

6. The parking assist device according to claim 5, wherein when the parking candidate area is not included in any one of the left effective detection range and the right effective detection range, the processor sets left guide display or the right guide display to non-display.

7. The parking assist device according to claim 1, wherein the processor further detects the obstacle existing in front of the vehicle by using a second sensor disposed in the vehicle, and enables display of the guide display in accordance with a result of the detection of the obstacle.

8. The parking assist device according to claim 7, wherein the processor enables display of the guide display based on the effective detection range relative to the vehicle, and
the guide display is display in which an image corresponding to the effective detection range is displayed while the image is superimposed on the obstacle inside the effective detection range.

9. The parking assist device according to claim 8, wherein the guide display is display in which a warning image is displayed while the image is superimposed on the obstacle outside the effective detection range.

10. The parking assist device according to claim 7, wherein the processor enables display of the guide display based on the effective detection range relative to the obstacle, and
the guide display includes both a traveling direction of the vehicle and an edge of a range including the effective detection range, the edge being on a side opposite to a side facing the obstacle.

11. The parking assist device according to claim 7, wherein the processor enables display of the guide display based on the effective detection range relative to the obstacle, and
the guide display includes an image of a virtual obstacle arranged along an edge of a range including the effective detection range, the edge being on a side opposite to a side facing the obstacle.

12. The parking assist device according to claim 1, wherein the guide display includes a recommended path of the vehicle.

* * * * *